United States Patent
Irie et al.

(10) Patent No.: US 10,665,188 B2
(45) Date of Patent: May 26, 2020

(54) LIQUID CRYSTAL DISPLAY DEVICE, AND DRIVE METHOD FOR LIQUID CRYSTAL DISPLAY DEVICE WITH DISCHARGE CAPACITOR CONNECTED TO SIGNAL LINE

(71) Applicant: Sakai Display Products Corporation, Osaka (JP)

(72) Inventors: Kentaro Irie, Osaka (JP); Masae Kitayama, Osaka (JP); Nobuyoshi Nagashima, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 12 days.

(21) Appl. No.: 16/094,434

(22) PCT Filed: Apr. 18, 2016

(86) PCT No.: PCT/JP2016/062253
§ 371 (c)(1),
(2) Date: Dec. 13, 2018

(87) PCT Pub. No.: WO2017/183081
PCT Pub. Date: Oct. 26, 2017

(65) Prior Publication Data
US 2019/0103066 A1   Apr. 4, 2019

(51) Int. Cl.
*G09G 3/36* (2006.01)
*G02F 1/1362* (2006.01)
*G02F 1/1368* (2006.01)

(52) U.S. Cl.
CPC ......... *G09G 3/3659* (2013.01); *G09G 3/3648* (2013.01); *G09G 3/3655* (2013.01);
(Continued)

(58) Field of Classification Search
CPC .. G09G 3/3655; G09G 3/3648; G09G 3/3614; G09G 3/3688; G09G 3/3677;
(Continued)

(56) References Cited

U.S. PATENT DOCUMENTS

| | | |
|---|---|---|
| 5,457,474 A | 10/1995 | Ikeda |
| 6,359,607 B1 | 3/2002 | Yanagi et al. |

(Continued)

FOREIGN PATENT DOCUMENTS

| | | |
|---|---|---|
| JP | H07134572 A | 5/1995 |
| JP | H10282471 A | 10/1998 |

(Continued)

OTHER PUBLICATIONS

Edited by Hiroo Hori and Koji Suzuki, "Series, Advanced Display Technology 2, Color Liquid Crystal Display", Kyoritsu Shuppan Co., Ltd., First Edition, pp. 247-248 Jun. 25, 2001.
(Continued)

*Primary Examiner* — Darlene M Ritchie
(74) *Attorney, Agent, or Firm* — Snell & Wilmer L.L.P.

(57) ABSTRACT

A liquid-crystal display apparatus and a method for driving liquid-crystal display apparatus are provided. Pixels arrayed in a form of a matrix are each defined so as to include an electrode pair consisting of a pixel electrode and a counter electrode facing one another via a liquid-crystal layer, and a scan signal is applied, from a scan-signal line for each line, to a control electrode of a TFT for applying a data signal to the pixel electrode included in the pixel. A signal to be raised when the scan signal for each line falls is applied to a signal line arranged between a pixel in each line and a pixel adjacent to the pixel at one side in the line direction.

4 Claims, 13 Drawing Sheets

(52) U.S. Cl.
CPC ...... *G02F 1/1368* (2013.01); *G02F 1/136213* (2013.01); *G02F 1/136286* (2013.01); *G09G 3/3614* (2013.01); *G09G 3/3677* (2013.01); *G09G 3/3688* (2013.01); *G09G 2300/0819* (2013.01); *G09G 2310/0248* (2013.01); *G09G 2310/0281* (2013.01); *G09G 2310/06* (2013.01); *G09G 2310/08* (2013.01); *G09G 2320/0219* (2013.01); *G09G 2320/0223* (2013.01); *G09G 2320/0233* (2013.01)

(58) Field of Classification Search
CPC ................. G09G 3/3659; G09G 3/364; G09G 2320/0223; G09G 2320/0233; G09G 2320/0219; G09G 2310/08; G09G 2310/06; G09G 2310/0281; G09G 2310/0248; G09G 2300/0819; G02F 1/1368; G02F 1/136286; G02F 1/136213
See application file for complete search history.

(56) References Cited

U.S. PATENT DOCUMENTS

| | | |
|---|---|---|
| RE46,025 E | 6/2016 | Shimoshikiryo |
| 2012/0229723 A1* | 9/2012 | Katsuta ............... G02F 1/13624 349/42 |
| 2013/0201166 A1* | 8/2013 | Wang ....................... G09G 3/18 345/204 |
| 2013/0229326 A1* | 9/2013 | Kamada ............... G09G 3/3648 345/32 |
| 2013/0328756 A1* | 12/2013 | Tsuei ................... G09G 3/3611 345/87 |
| 2015/0029175 A1 | 1/2015 | Kobayashi et al. |
| 2016/0210915 A1* | 7/2016 | Wang ................... G09G 3/3659 |

FOREIGN PATENT DOCUMENTS

| | | |
|---|---|---|
| JP | H11281957 A | 10/1999 |
| JP | 2004062146 A | 2/2004 |
| JP | 2004341414 A | 12/2004 |
| JP | 2008216363 A | 9/2008 |
| WO | 2012063830 A1 | 5/2012 |
| WO | 2013129260 A1 | 9/2013 |

OTHER PUBLICATIONS

PCT International Search Report, PCT Application No. PCT/JP2016/062253, Japan Patent Office dated Jul. 19, 2016.

English Translation of PCT International Search Report, PCT Application No. PCT/JP2016/062253, Japan Patent Office Jul. 19, 2016.

* cited by examiner

FIG. 2
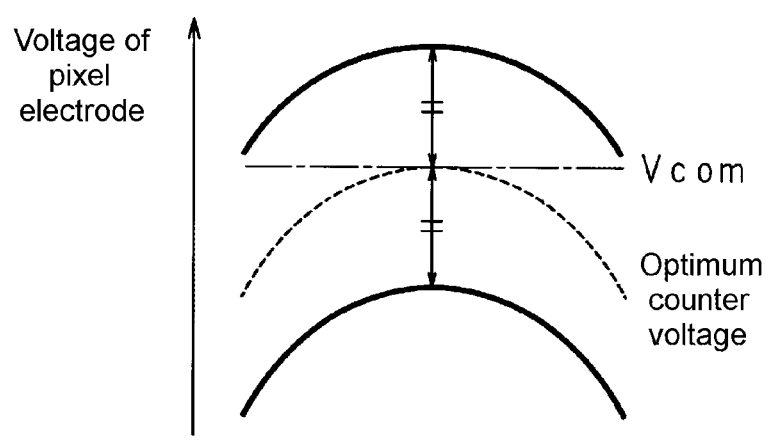
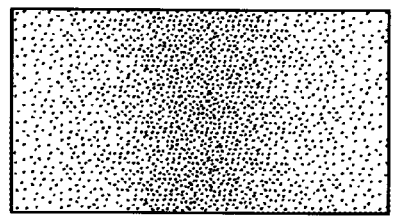

LIQUID CRYSTAL DISPLAY DEVICE, AND DRIVE METHOD FOR LIQUID CRYSTAL DISPLAY DEVICE WITH DISCHARGE CAPACITOR CONNECTED TO SIGNAL LINE

CROSS-REFERENCE TO RELATED APPLICATIONS:

This patent application is a U.S. National Stage of International Application No. PCT/JP2016/062253, filed on Apr. 18, 2016 (pending).

TECHNICAL FIELD

The present invention relates to a liquid-crystal display apparatus, and in particular to an active matrix type liquid-crystal display apparatus using switching elements such as thin-film transistors, and to a method for driving liquid-crystal display apparatus.

BACKGROUND ART

The liquid-crystal display apparatus is a flat-panel display apparatus having superior features such as high definition, thin type, lightweight, and low power consumption, and is widely used for a flat panel television, PC monitor, digital signage, and others. In the flat display apparatus of the active matrix type, a data signal is written in a pixel electrode in individual pixels included in the liquid-crystal panel (which is also simply referred to as the panel hereinafter) from data-signal bus line through thin-film transistor (TFT) in selection periods for each pixel.

In the selection periods for the respective pixels, scan signal as selection signal is applied from scan-signal line to a gate of a TFT of each pixel. In this case, it is known that when the driving voltage for the gate rises, a feed-through voltage (so-called pull-in voltage) occurs due to the influence of the parasitic capacitance between the gate and the drain of the TFT, and the voltage of the pixel electrode lowers below a voltage of the data signal (See Non-patent Document 1).

For example, when the parasitic capacitance between the gate and the drain of the TFT and the parasitic capacitance between the source and the drain of the TFT are respectively denoted by Cgd and Csd, and the capacitance of each pixel (which corresponds to the sum of the liquid-crystal capacitance, the auxiliary capacitance connected in parallel with the liquid-crystal capacitance, and the parasitic capacitances Cgd and Csd) is denoted by Cpx, the above pull-in voltage $\Delta Vd$ is expressed by the following expression (1):

$$\Delta Vd = (Cgd/Cpx) \times (VgH - VgL), \quad (1)$$

where VgH denotes the voltage when the scan signal is at the high level, and

VgL denotes the voltage when the scan signal is at the low level.

Since the actual scan-signal line is regarded as distributed constant line having a reactance component and a resistance component, the waveforms of the scan signal is more deformed with distance from a driving end. Therefore, the magnitude of the pull-in voltage expressed by the expression (1) varies with the position on the panel in the direction along the scan-signal line.

FIG. 1 is an explanation drawing for explaining voltage of a scan signal and voltage of a pixel electrode in a conventional liquid-crystal display apparatus. For a panel edge part and a panel center part in the direction along the scan-signal lines, the waveform of the voltage of a scan-signal and the waveform of the voltage of a pixel electrode are respectively shown on the upper and lower sides of FIG. 1. The abscissa in FIG. 1 indicates time. The scan signal is driven from both of the right and left edges. In FIG. 1, Vs+ and Vs− respectively indicate the signal levels of the positive data signal and negative data signal.

At the edge part of the panel, i.e., at the driving end for the scan signal, the scan signal rapidly fall, and the voltage of the pixel electrode is lowered $\Delta Vd0$ below the voltage of the data signal (Vs+ and Vs−) due to the pull-in voltage corresponding to the amplitudes of the fall of the scan signal. The amount $\Delta Vd0$ corresponds to the value expressed by the expression (1). In FIG. 1, the voltages of the pixel electrode in the case where the positive data signal is written in the pixel electrode and in the case where the negative data signal is written in the pixel electrode are shown in an overlapped manner.

On the other hand, at the central part of the panel, because of occurrence of deformation in rise and fall of the scan signal, each TFT is turned on and a data signal is written in the pixel electrode when the voltage of the scan signal exceeds a voltage which is higher than the voltage of the data signal (Vs+ or Vs−) by the threshold level of the TFT. Thereafter, the TFT is turned off when the voltage of the scan signal falls below the voltage higher than the voltage of the data signal by the threshold level of the TFT. In FIG. 1, for simplicity purpose, the threshold level of the TFT is assumed to be 0 V. As shown in the drawing, at the central part of the panel, when a positive (or negative) data signal is written, it takes a time Tf1 (or Tf2) until the TFT is turned off after the scan signal starts to rise.

Since the TFT is slowly turned from ON to OFF during the time Tf1 (or Tf2), transfer of electric charge (so-called recharging) occurs between the signal line for the data signal and the pixel electrode, and a pull-in voltage $\Delta Vd1$ (or $\Delta Vd2$), smaller than $\Delta Vd0$, occurs. The magnitude of $\Delta Vd1$ (or $\Delta Vd2$) decreases with increase in the time Tf1 (or Tf2), in which the recharging occurs. That is, the closer to the central part of the panel than the edge part the pixel is, the smaller the magnitude of the pull-in voltage taking into account the recharging is, and the amount of lowering of the voltage of the pixel electrode also becomes smaller. In addition, since the pull-in voltage taking into account the recharging is smaller in the case where the negative data signal is written than in the case where the positive data signal is written, the closer to the central part of the panel than the edge part the pixel is, the smaller the amplitude of the effective voltage of the pixel electrode is, and the brightness of the pixel becomes lower.

FIG. 2 is an explanation drawing for explaining deviation of counter voltage and luminance non-uniformity in a conventional liquid-crystal display apparatus. Distributions of the voltages of pixel electrodes and luminance non-uniformity are respectively shown in the upper part and lower part of FIG. 2. In the upper part of FIG. 2, the distributions in a case where positive data signal is written in the pixel electrode and in a case where negative data signal is written in the pixel electrode are shown together by solid lines. The abscissa in FIG. 2 indicates the distance from the left edge of the panel. In FIG. 2, Vcom represented by the dash-dot line indicates the counter voltage, i.e., the voltage level of the counter electrode. The scan signal is assumed to be driven from both of the right and left edges of the panel.

Because of the characteristics of the pull-in voltage taking into account the above-mentioned recharging, the voltage distribution of pixel signals draws an upward convex curve which is minimized at both ends of the panel and is maximized in the central part of the panel. Generally, the counter voltage is adjusted to an optimum counter voltage in the middle between the positive data signal and the negative data signal which are written in pixel electrode. In the case where the voltages of the pixel signals have a distribution characteristic as shown in the upper part of FIG. 2, the optimum counter voltage should vary drawing an upward convex curve as shown by the dashed line. However, since the conventional counter voltage is set to a constant voltage over the entire surface on the panel, if the counter voltage is set focusing the central part of the panel, a counter voltage which is greatly biased to the positive side compared with the optimum counter voltage is applied in the edge parts of the panel. In addition, since the brightness of the pixels has a distribution as described above, luminance non-uniformity in which the screen is displayed such that the edge parts of the panel are brighter than the central part occurs as shown in the lower part of FIG. 2.

As described above, the magnitude of the pull-in voltage ΔVd and the amplitude of the effective voltage show the distribution characteristic of decreasing depending on the distance from the driving end for the scan signal, and are uneven in the panel surface. Therefore, inexpediency exists, which may be, for example, occurrence of the luminance non-uniformity in respective pixels or occurrence of a flicker depending on the frame rate. Further, since the optimum counter voltage for each pixel varies with the distance from the driving end for the scan signal, uniform AC driving of the liquid crystal within the panel surface becomes impossible, thereby, burn-in due to application of DC components to the liquid crystal is caused.

In view of above, in Patent Document 1, there is proposed a liquid-crystal panel in which a gate driver (driver circuit) is connected to one end of a scan-signal line, and a discharge circuit is connected to the other end of the scan-signal line, thereby, the other end is opened when a scan signal applied from the one end of the scan-signal line is in an ON level, and when the scan signal is in an OFF level, a control voltage for OFF is also applied from the other end. In addition, in Patent Document 2, there is proposed a liquid-crystal panel in which waveforms of the falling edges of the scan signal at the driving end for the scan signal and at the terminating end are approximately equalized without being affected by the propagation delay characteristic of the scan-signal line, by making the falling edge of the scan signal have a waveform of an approximately straight inclined line. Further, Patent Document 3 proposes a driving circuit for a liquid-crystal display apparatus. The driving circuit adds, to a data signal, a correction voltage according to a deviation of the pull-in voltage ΔVd for each of a plurality of display areas in horizontal direction.

PRIOR ART DOCUMENT

Non-patent Document 1: Edited by Hiroo Hori and Koji Suzuki, "Series, Advanced Display Technology 2, Color Liquid Crystal Display", Kyoritsu Shuppan Co., Ltd., First Edition, Jun. 25, 2001, pp 247-248.
Patent Document 1: JP H10-282471
Patent Document 2: JP H11-281957
Patent Document 3: JP H7-134572

SUMMARY OF THE INVENTION

Problem to be Solved by the Invention

However, according to the technique described in Patent Document 1, although the difference in the pull-in voltages ΔVd according to the display positions can be reduced, it is difficult to sufficiently uniformize the pull-in voltage ΔVd over the entire panel. In addition, according to the technique described in Patent Document 2, the circuitry for making the falling edge of the scan signal have a waveform of an approximately straight inclined line is complex. Further, according to the technique described in Patent Document 3, the circuitry for adding, to the data signal, a correction voltage according to a deviation of the pull-in voltage ΔVd is complex.

The present invention has been made in view of the above circumstances, and the object of the present invention is to provide a liquid-crystal display apparatus and a method for driving liquid-crystal display apparatus which can prevent the optimum voltage for a counter electrode facing a pixel electrode from deviating from a preset counter voltage, and prevent emergence of a distribution of the effective voltages of the pixel electrodes.

Means to Solve the Problem

A liquid-crystal display apparatus according to an aspect of the present invention is a liquid-crystal display apparatus comprising: pixels each defined so as to include an electrode pair consisting of a pixel electrode and a counter electrode facing one another via a liquid-crystal layer, the pixels being arrayed in a form of a matrix; a switching element for applying a data signal to the pixel electrode included in the pixels; and a signal line arranged between pixels adjacent to one another in a row direction in which rows of the matrix are arranged, wherein a scan signal is applied to a control electrode of the switching element for each row of the matrix; wherein a signal to be raised when the scan signal falls is applied to the signal line, for each row of the matrix.

A method for driving liquid-crystal display apparatus according to an aspect of the present invention is a method for driving liquid-crystal display apparatus, the apparatus comprising: pixels each defined so as to include an electrode pair consisting of a pixel electrode and a counter electrode facing one another via a liquid-crystal layer, the pixels being arrayed in a form of a matrix; a switching element for applying a data signal to the pixel electrode included in the pixels; and a signal line arranged between pixels adjacent to one another in a row direction in which rows of the matrix are arranged, wherein a scan signal is applied to a control electrode of the switching element for each row of the matrix, the method comprising applying a signal to be raised when the scan signal falls, to the signal line, for each row of the matrix.

Effect of the Invention

According to the above description, the lowering of the voltage due to the pull-in voltage which occurs in the pixel electrode when the scan signal falls and the increase in the voltage which occurs in the pixel electrode due to the same principle as the pull-in voltage when the signal from the signal line rises cancel out each other.

Therefore, it is possible to prevent the optimum voltage for the counter electrode facing the pixel electrode from deviating from a preset counter voltage, and prevent emergence of a distribution of the effective voltages of the pixel electrodes.

BRIEF DESCRIPTION OF THE DRAWINGS

FIG. 2 is an explanation drawing for explaining deviation of counter voltage and luminance non-uniformity in a conventional liquid-crystal display apparatus.

EMBODIMENTS FOR CARRYING OUT THE INVENTION

Figure 1:
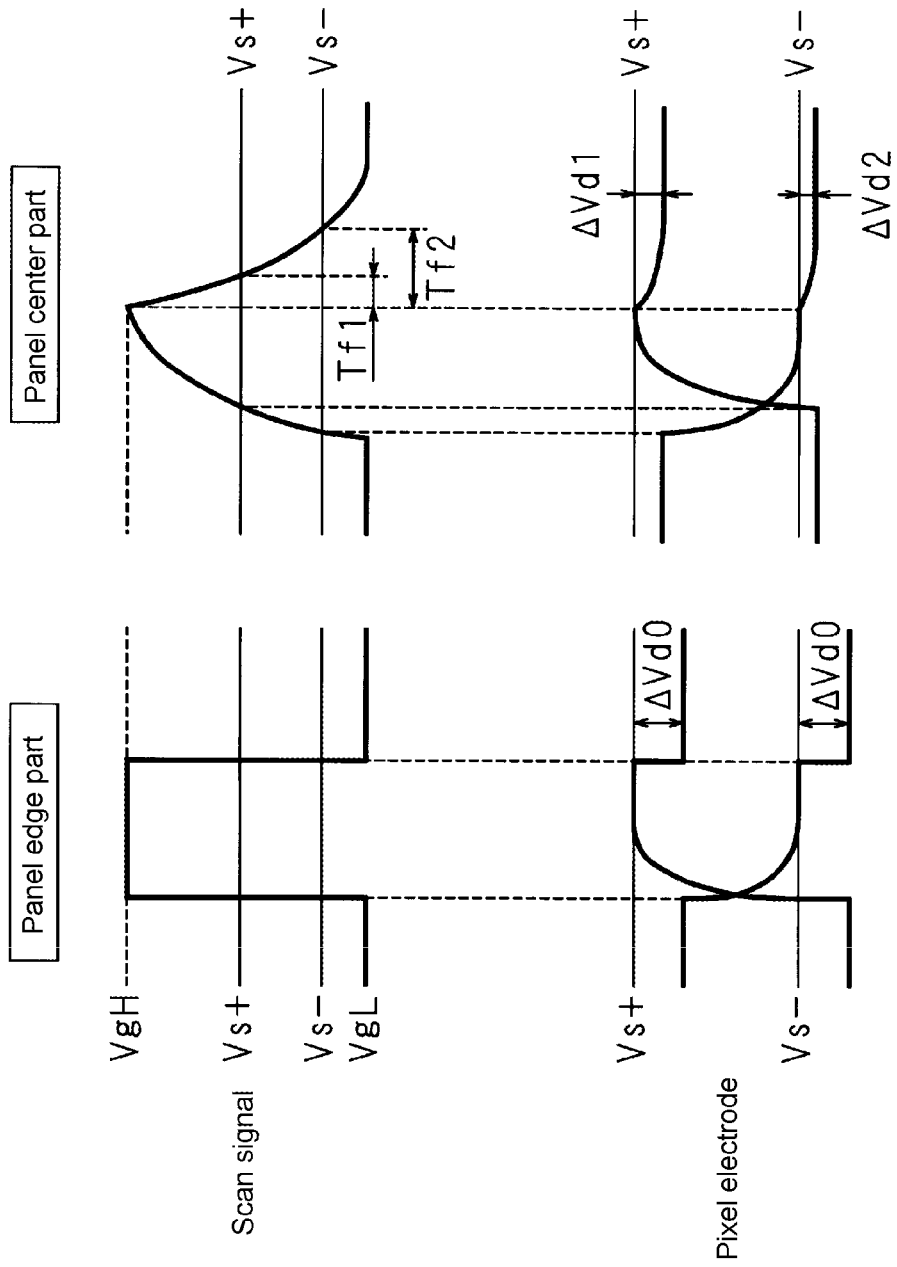
FIG. 1 is an explanation drawing for explaining voltage of a scan signal and voltage of a pixel electrode in a conventional liquid-crystal display apparatus.

Explanation of Embodiments of the Present Invention

First, embodiments of the present invention are listed up and explained. It is appreciated that at least portions of the aspects described below may be arbitrarily combined with each other.

(1) A liquid-crystal display apparatus according to an aspect of the present invention comprises: pixels each defined so as to include an electrode pair consisting of a pixel electrode and a counter electrode facing one another via a liquid-crystal layer, the pixels being arrayed in a form of a matrix; a switching element for applying a data signal to the pixel electrode included in the pixels; and a signal line arranged between pixels adjacent to one another in a row direction in which rows of the matrix are arranged, wherein a scan signal is applied to a control electrode of the switching element for each row-of the matrix, and wherein a signal to be raised when the scan signal falls is applied to the signal line, for each row of the matrix.

According to the present aspect, the pixels arrayed in a form of the matrix are each defined so as to include the electrode pair consisting of the pixel electrode and the counter electrode facing one another via the liquid-crystal layer, and the scan signal is applied, for each row (i.e., for each line) of the matrix, to the control electrode of the switching element for applying a data signal to the pixel electrode included in the pixels. In addition, a signal to be raised when the scan signal for each line falls is applied to the signal line arranged between a pixel in each line and a pixel adjacent to the pixel at one side in a line direction (i.e., the direction in which the lines are arranged).

Therefore, the lowering of the voltage due to the pull-in voltage which occurs in the pixel electrode when the scan signal falls and the increase in the voltage which occurs in the pixel electrode due to the same principle as the pull-in voltage when the signal from the signal line rises cancel out each other.

(2) In a liquid-crystal display apparatus according to an aspect of the present invention, a scan signal for a next row is applied to the signal line, for each row of the matrix.

According to the present aspect, to the signal line of each line, a scan signal for the next line is applied. In other words, a scan signal for each line is applied to the signal line arranged between each line and the preceding line thereof, and another scan signal, which is delayed by one scan period from the scan signal for each line, is applied to the signal line arranged between each line and the next line thereof.

Therefore, in the case in which the scan signal for the next line rises when the scan signal for each line falls, the scan signal is substituted for the signal to be applied to the signal line.

(3) In a liquid-crystal display apparatus according to an aspect of the present invention, the pixels comprise at least first and second subpixels being arranged in a direction intersecting the signal line, the switching element comprises first and second switching elements to apply the data signal to subpixel electrodes each included in the first and second subpixels respectively, an electrode pair consisting of a discharge-capacitance electrode contained included in the second subpixel and a discharge-capacitance counter electrode connected to a predetermined electric potential is provided, and a third switching element connected between the subpixel electrode in the second subpixel and the discharge-capacitance electrode is provided, and for each row of the matrix, a control electrode of the third switching element is connected to the signal line for a next row, and a discharge signal is applied to the signal line for the next row, wherein the discharge signal is raised to turn on the third switching element when the scan signal falls.

According to the present aspect, the pixels arrayed in the form of the matrix comprise at least the first and second subpixels which are arranged in a direction intersecting the signal line, and the first and second subpixels are each defined so as to include an electrode pair consisting of the subpixel electrode and the counter electrode facing one another via the liquid-crystal layer. The scan signal is applied, for each line, to the control electrodes of the first and second switching elements for applying the data signal to the subpixel electrodes each included in the first and second subpixels. The discharge-capacitance electrode is connected to the subpixel electrode of the second subpixel through the third switching element the control electrode of which is connected to the signal line for the next line, and the discharge-capacitance counter electrode connected to the predetermined electric potential is facing the discharge-capacitance electrode. The discharge signal which is raised to turn on the third switching element when after the scan signal falls is applied to the control electrode of the third switching element, from the signal line for the next line. In other words, the signal from the signal line for each line is the discharge signal for the preceding line.

Thus, in the configuration in which the first subpixel in the pixel in each line and the second subpixel in the pixel in the preceding line are arranged adjacent to each other via the signal line, and the discharge signal for the preceding line is raised when the scan signal for each line falls, the lowering of the voltage due to the pull-in voltage and the increase in the voltage due to the same principle as the pull-in voltage cancel each other out. The pull-in voltage occurs in the subpixel electrode of the first subpixel when the scan signal for each line falls, and the increase in the voltage occurs in the subpixel electrode of the first subpixel when the signal from the signal line rises.

(4) In a liquid-crystal display apparatus according to an aspect of the present invention, the polarity of the data signal applied to the pixels is inverted for each frame period.

According to the present aspect, because the polarity of the data signal applied to each pixel is inverted for each frame period, application of DC voltage to the liquid-crystal layer is prevented. In addition, in the case where each pixel has first and second subpixels, the voltage of the subpixel electrode of the second subpixel effectively changes when the third switching element is turned on, so that the difference in brightness between the two subpixels can be increased.

(5) In a liquid-crystal display apparatus according to an aspect of the present invention, the pixels are each defined so as to further include an electrode pair consisting of an auxiliary-capacitance electrode connected to the pixel electrode and an auxiliary-capacitance counter electrode connected to a predetermined electric potential.

According to the present aspect, the electrode pair consisting of the auxiliary-capacitance electrode and the auxiliary-capacitance counter electrode is included the electrode pair for defining the pixel, the auxiliary-capacitance electrode is electrically connected to the pixel electrode, and the auxiliary-capacitance counter electrode is connected to the predetermined electric potential.

Therefore, the auxiliary capacitance formed by the auxiliary-capacitance electrode and the auxiliary-capacitance counter electrode is connected in parallel with a liquid-crystal capacitance formed by the pixel electrode and the counter electrode, and therefore, the voltage applied to the liquid-crystal layer by the pixel is stably maintained for at least one frame period.

(6) A method for driving liquid-crystal display apparatus according to one aspect of the present invention, the apparatus comprising: pixels each defined so as to include an electrode pair consisting of a pixel electrode and a counter electrode facing one another via a liquid-crystal layer, the pixels being arrayed in a form of a matrix; a switching element for applying a data signal to the pixel electrode included in the pixels; and a signal line arranged between pixels adjacent to one another in a row direction in which rows of the matrix are arranged, wherein a scan signal is applied to a control electrode of the switching element for each row of the matrix, the method comprising applying a signal to be raised when the scan signal falls, to the signal line, for each row of the matrix.

According to the present aspect, the liquid-crystal display apparatus is driven by the method for driving liquid-crystal display apparatus, therefore as with the aspect (1), the lowering of the voltage due to the pull-in voltage which occurs in the pixel electrode when the scan signal falls and the increase in the voltage which occurs in the pixel electrode due to the same principle as the pull-in voltage when the signal from the signal line rises cancel out each other.

Details of the Embodiments of the Present Invention

Hereinbelow, specific examples of a liquid-crystal display apparatus and a method for driving liquid-crystal display apparatus according to embodiments of the present invention are described with reference to the drawings. However, the present invention is not limited to such examples, and it is intended that the present invention is indicated by the claims, and any modifications within the meaning and the range equivalent to the claims are included in the present invention. The technical features described in each embodiment can be combined with each other.

Embodiment 1

Figure 3:
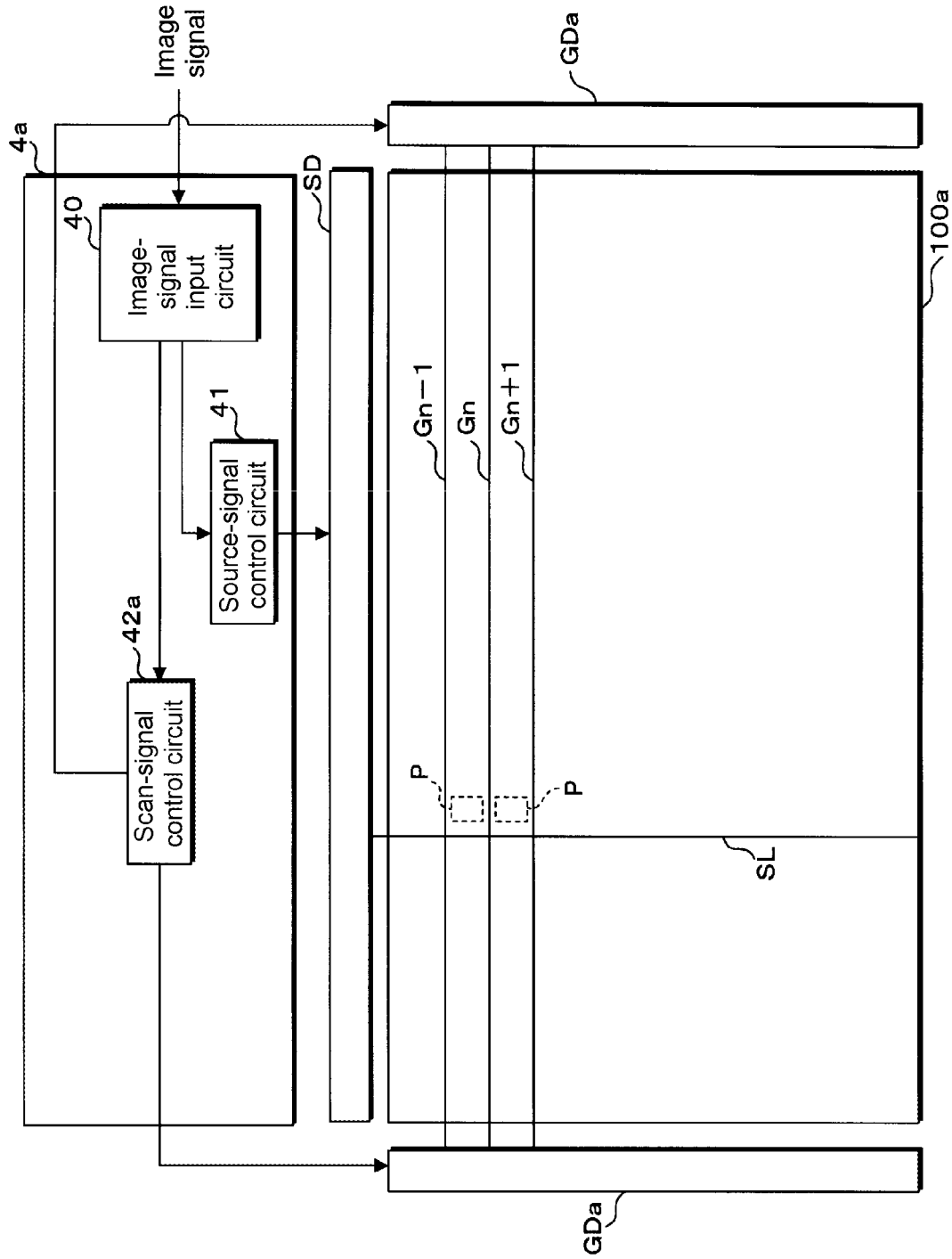
FIG. 3 is a block diagram showing an example of a configuration of a liquid-crystal display apparatus according to Embodiment 1 of the present invention.
Figure 4:
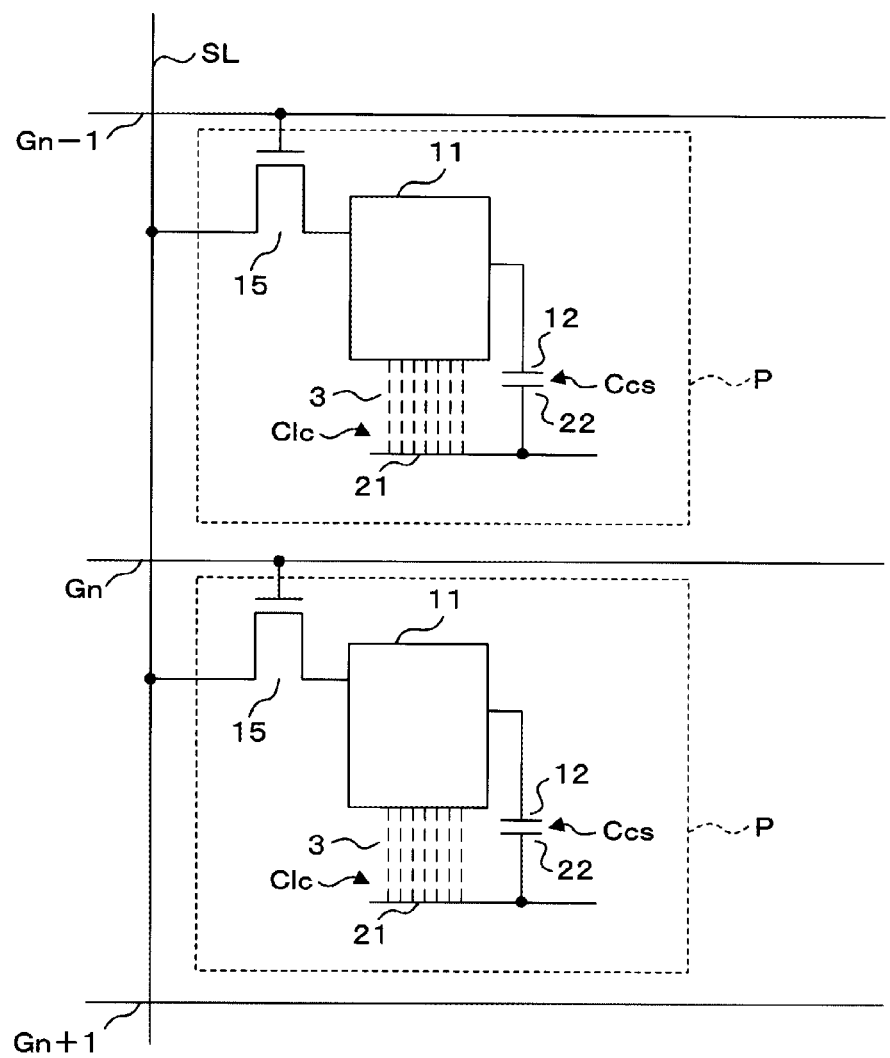
FIG. 4 is an explanation drawing schematically showing a configuration to define pixels in the liquid-crystal display apparatus according to Embodiment 1.

FIG. 3 is a block diagram showing an example of a configuration of a liquid-crystal display apparatus according to Embodiment 1 of the present invention, and FIG. 4 is an explanation drawing schematically showing a configuration to define pixel P in the liquid-crystal display apparatus according to Embodiment 1. The liquid-crystal display apparatus shown in FIG. 3 includes a liquid-crystal panel 100*a* in which pixels P each defined so as to include an electrode pair described later are arrayed in a form of a matrix in the vertical direction (hereinafter referred to as the row direction) of a display screen and in the horizontal direction (hereinafter referred to as the column direction) of the display screen. In FIG. 3, two pixels P consecutively arrayed in the row direction on the liquid-crystal panel 100*a* and signal lines related to these pixels P are representatively shown. In the following description, it is assumed that a pair of electrodes facing one another via a liquid-crystal layer 3 or an insulating layer (not shown) forms an electric capacitance (capacitor). In addition, the row of the matrix is also referred to as line.

In FIG. 4, each pixel P is defined so as to include an electrode pair consisting of a pixel electrode 11 and a counter electrode 21 facing one another via the liquid-crystal layer 3 and an electrode pair consisting of an auxiliary-capacitance electrode 12 and an auxiliary-capacitance counter electrode 22. The drain electrode of a TFT 15 (corresponding to the switching element) is connected to the pixel electrode 11. The pixel electrode 11 and the auxiliary-capacitance electrode 12 are electrically connected. The auxiliary-capacitance counter electrode 22 is connected to the electric potential of the counter electrode 21. As Embodiment 2 described later, the auxiliary-capacitance counter electrode 22 may be connected to a predetermined electric potential different from the electric potential of the counter electrode 21. The pixel electrode 11 and the counter electrode 21 form a liquid-crystal capacitance Clc. The auxiliary-capacitance electrode 12 and the auxiliary-capacitance counter electrode 22 form an auxiliary capacitance Ccs.

A source-signal line SL for applying a source signal (corresponding to the data signal) to the pixel electrode 11 through the TFT 15 is linearly arranged in the vertical direction, on one side of the pixel P in the horizontal direction. The source electrode of the TFT 15 is connected to the source-signal line SL. The gate electrode (corresponding to the control electrode) of the TFT 15 in the nth line is connected to a scan-signal line Gn linearly arranged to extend in the horizontal direction between the pixel P in the nth line and the pixel P in the (n−1)th line. The scan-signal lines Gn−1, Gn, Gn+1, - - - are arranged in parallel in the row direction, for each row.

Referring to FIG. 3, the liquid-crystal display apparatus according to Embodiment 1 further includes gate drivers GDa, GDa for applying scan signals to the scan-signal lines Gn−1, Gn, Gn+1, - - -, a source driver SD for applying source signals to the source-signal lines SL, SL, - - -, and a display control circuit 4a for controlling display with the liquid-crystal panel 100a by use of the gate drivers GDa, GDa and the source driver SD.

The display control circuit 4a includes an image-signal input circuit 40 for receiving an image signal including image data representing an image, and a scan-signal control circuit 42a and a source-signal control circuit 41 for controlling the gate drivers GDa, GDa and the source driver SD respectively on the basis of a clock signal and a synchronization signal separated by the image-signal input circuit 40.

The scan-signal control circuit 42a and the source-signal control circuit 41 each generates control signals such as a start signal, a clock signal, and an enable signal, which are needed for periodic operations of the gate drivers GDa, GDa and the source driver SD. In addition, the source-signal control circuit 41 outputs, to the source driver SD, digital image data separated by the image-signal input circuit 40.

The gate drivers GDa, GDa apply a scan signal in each horizontal scan period to the scan-signal lines Gn−1, Gn, Gn+1 sequentially within one frame period of the image data. The source driver SD stores digital image data (serial data) provided from the source-signal control circuit 41 for one horizontal scan period (1H), generates analog source signals (parallel signals) representing an image for one line, and applies the generated source signals to the source-signal lines SL, SL, - - - for each column in parallel. The source signals for one line are updated for each horizontal scan period.

The scan signal which has been applied to one of the scan-signal lines Gn−1, Gn, Gn+1, - - - is applied to the gate electrodes of the TFTs 15 each included in the respective pixels P, P, - - - for one line, which are arranged in the column direction. In Embodiment 1, when the scan signal for each line falls, the scan signal for the next line is raised. Specifically, a signal width of the scan signal is adjusted by the scan-signal control circuit 42a so that the signal width of the scan signal becomes approximately equal to the one horizontal scan period.

During one horizontal scan period in which a scan signal is applied to one scan-signal line Gn, the source signals which have been applied to the source-signal lines SL, SL, - - - are applied to the pixel electrodes 11 and the auxiliary-capacitance electrode 12 through the TFTs 15 the gate electrodes of which are connected to the one scan-signal line Gn. Therefore, the source signal is written in the liquid-crystal capacitance Clc and the auxiliary capacitance Ccs which are formed in the pixel P. Thus, the source signals for one line are simultaneously written in the pixels P, P, - - - for one line during one horizontal scan period. The source signals written in the respective pixels P are held for one frame period.

Next, the optical configuration of the liquid-crystal panel 100a is described.

Figure 5:
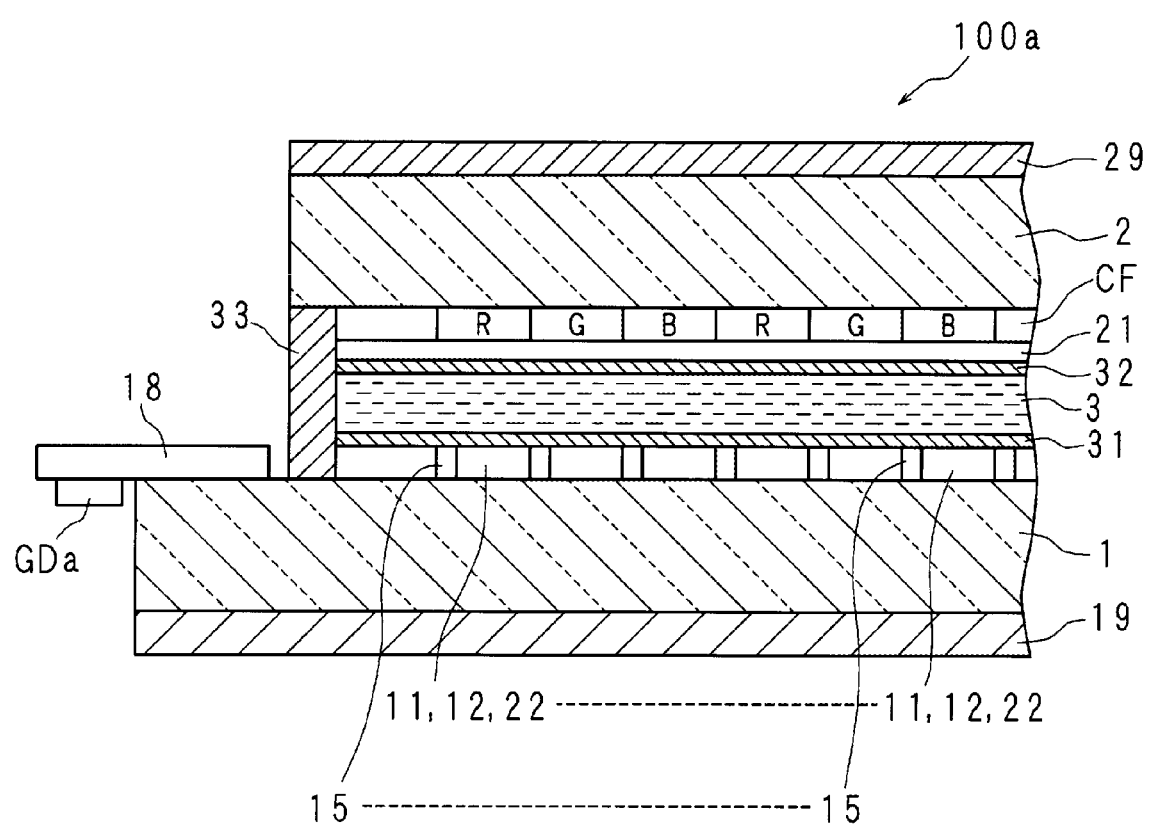
FIG. 5 is a cross-sectional view schematically showing a configuration of a liquid-crystal panel.

FIG. 5 is a cross-sectional view schematically showing the configuration of the liquid-crystal panel 100a. The liquid-crystal panel 100a is formed by interposing the liquid-crystal layer 3 between a first glass substrate (array substrate) 1 and a second glass substrate 2. A sealing member 33 for sealing the liquid crystal enclosed in the liquid-crystal layer 3 is provided along the peripheral part of the second glass substrate 2 between one surface of the first glass substrate 1 and one surface of the second glass substrate 2 facing the one surface of the first glass substrate 1.

Above the one surface of the first glass substrate 1 an alignment film 31 is formed on a layer including the TFTs 15, the pixel electrodes 11, the auxiliary-capacitance electrodes 12, and the auxiliary-capacitance counter electrodes 22, each of which includes transparent electrode. A polarization plate 19 is attached to the other surface of the first glass substrate 1. A flexible substrate 18 on which the gate driver GDa is surface-mounted is attached to one edge part of the one surface of the first glass substrate 1.

A lamination of the counter electrode 21 consisting of a transparent electrode and an alignment film 32 is formed on the one surface of the second glass substrate 2. A color filter CF is formed between the second glass substrate 2 and the counter electrode 21. The color filter may be formed between the alignment film 31 and the above-mentioned layer including the TFT 15 and the others. A polarization plate 29 is attached to the other surface of the second glass substrate 2. A polarization direction (polarization plane) of the light passing through the polarization plate 19 and a polarization direction of the light passing through the polarization plate 29 are differentiated by 90 degrees. Backlight (not shown) is provided over the other surface (to which the polarization plate 19 is attached) of the first glass substrate 1.

In the above-mentioned configuration, for example, in the case of the normally black type, when no voltage is applied between the pixel electrode 11 and the counter electrode 21 for the pixel P, the light which has been emitted from the backlight and has passed through the polarization plate 19 is absorbed by the polarization plate 29 because the polarization direction of the light passing through the pixel P is not changed. On the other hand, when a voltage is applied between the pixel electrode 11 and the counter electrode 21 of the pixel P, the polarization direction of the light passing through the pixel P varies with the magnitude of the voltage. Therefore, the polarization direction of the light which has been emitted from the backlight and has passed through the polarization plate 19 varies with the magnitude of the voltage, and thereby the light passes through the polarization plate 29. Thus, the brightness of the image which the pixels P display varies.

Next, parasitic capacitances, which is not explicitly shown in FIG. 4, are described.

Figure 6:
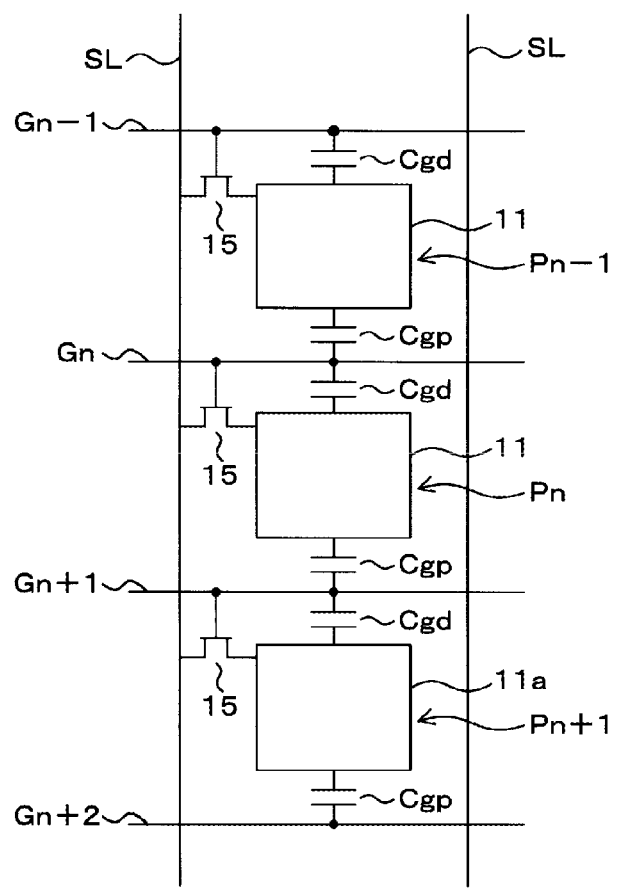
FIG. 6 is an explanation drawing for showing parasitic capacitances accompanying the pixels in the liquid-crystal display apparatus according to Embodiment 1.

FIG. 6 is an explanation drawing for showing the parasitic capacitances accompanying the pixels P in the liquid-crystal display apparatus according to Embodiment 1. In FIG. 6, for later explanations, a pixel in the nth line (where n is an integer equal to or greater than zero, the same applying hereafter) is denoted by Pn. Since the parasitic capacitances similarly accompany any of the pixels Pn−1, Pn, and Pn+1, the following explanations are focused on the pixel Pn.

In the TFT 15 of which drain electrode is connected to the pixel electrode 11 of the pixel Pn, a parasitic capacitance exists between the drain and the gate. In addition, a stray capacitance exists between the pixel electrode 11 of the pixel Pn and the scan-signal line Gn connected to the gate electrode of the TFT 15. Since the above parasitic capacitance between the drain and the gate and the stray capacitance behave as parallel capacitances, these capacitances are collectively referred to as the parasitic capacitance Cgd. Further, a stray capacitance exists between the pixel electrode 11 of the pixel Pn and the scan-signal line Gn+1. This stray capacitance is referred to as the parasitic capacitance Cgp.

Hereinbelow, specific examples in which the problem of the present application is solved are described.

Figure 7:
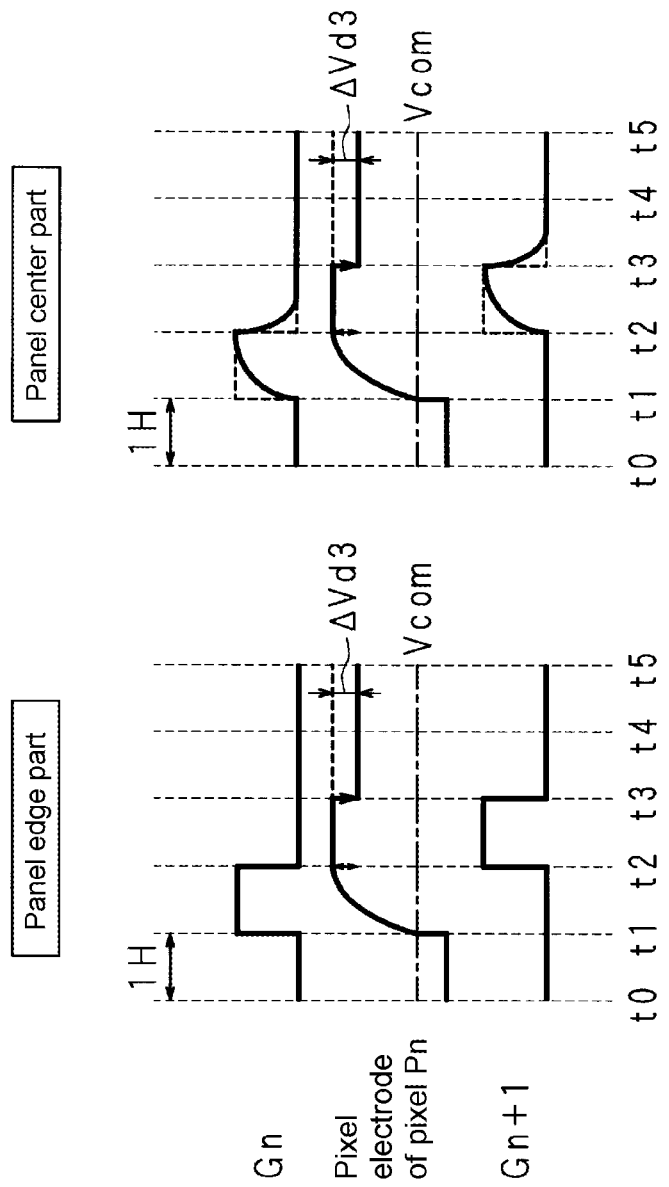
FIG. 7 is a timing chart showing variations with time in the voltages of signals applied to scan-signal lines and the voltages of pixel electrodes in the liquid-crystal display apparatus according to Embodiment 1.

FIG. 7 is a timing chart showing variations with time in the voltages of signals applied to scan-signal lines and variations with time in the voltage of the pixel electrode 11 in the liquid-crystal display apparatus according to Embodiment 1. The upper, middle, and lower parts of FIG. 7 respectively show the signal level in the scan-signal line Gn in the nth line, the voltage of the pixel electrode 11 of the pixel Pn, and the signal level in the scan-signal line Gn+1 in the (n+1)th line, for the panel edge part and the panel center part in the direction along the scan-signal lines. The abscissa indicates time. Regarding the signal levels, the positive pulses indicate ON states. The intervals between the vertical dashed lines are "1H". The horizontal dash-dot line indicates the electric potential of the counter electrode 21, i.e., the electric potential of the counter voltage Vcom. Although the polarity of the voltage waveform of the pixel electrode 11 is inverted with respect to Vcom after one frame so as to be negative, FIG. 7 representatively shows the case where a positive data signal is written.

At the panel edge part shown in the left half of FIG. 7, the scan signals from the respective scan-signal lines Gn and Gn+1 have been generated so as to have the signal width of "1H" and the time difference of "1H" from each other. When the scan signal from the scan-signal line Gn rises to the ON state at time t1, the TFT 15 of the pixel Pn is turned on (into the conductive state), and the data signal from the source-signal line SL is applied to the pixel electrode 11 and the auxiliary-capacitance electrode 12 in the pixel Pn (See FIG. 4). Thus, the voltage of the pixel electrode 11 reaches to the same level as the voltage of the source-signal line SL in the interval from time t1 to time t2, so that the data signal is written in the pixel electrode 11. This voltage is the voltage which is applied to the liquid-crystal capacitance Clc.

Thereafter, when the scan signal from the scan-signal line Gn falls to the OFF state at time t2, the TFT 15 of the pixel Pn is turned off (into the nonconductive state). At time t2, the voltage of the pixel electrode 11 of the pixel Pn is pushed down by the feed-through voltage (so-called pull-in voltage) by the influence of the parasitic capacitance Cgd. When the capacitance of each pixel P (which corresponds to the sum of the liquid-crystal capacitance Clc, the auxiliary capacitance Ccs, the parasitic capacitance Cgd and Cgp shown in FIG. 6, and the parasitic capacitance Csd between the source and the drain of the TFT 15) is denoted by Cpix, the pull-in voltage ΔVd due to Cgd is expressed by the following expression (2):

$$\Delta Vd = (Cgd/Cpix) \times (VgH - VgL), \quad (2)$$

where VgH denotes the voltage when the scan signal is at the high level, and

VgL denotes the voltage when the scan signal is at the low level.

As described above, Embodiment 1 is configured such that the scan signal from the scan-signal line Gn+1 corresponding to the line next to the line including the pixel Pn is raised at time t2. Therefore, at time t2, the voltage of the pixel electrode 11 of the pixel Pn is pushed up by a voltage corresponding to the pull-in voltage due to the influence of the parasitic capacitance Cgp shown in FIG. 6. The voltage ΔVd' at this time corresponding to the pull-in voltage is expressed by the following expression (3).

$$\Delta Vd' = (Cgp/Cpix) \times (VgH - VgL) \quad (3)$$

When the magnitudes of the parasitic capacitances Cgd and Cgp are approximately equal, the voltage ΔVd expressed by the expression (2) is canceled out by the voltage ΔVd' expressed by the expression (3). That is, since the voltage of the pixel electrode 11 of the pixel Pn is approximately equally affected by the voltage push-down due to the fall of the scan signal from the scan-signal line Gn and the voltage push-up due to the rise of the scan signal from the scan-signal line Gn+1, the voltage of the pixel electrode 11 of the pixel Pn is maintained at approximately the voltage not affected by the above-mentioned scan signals at all. Thereafter, when the scan signal from the scan-signal line Gn+1 falls at time t3, the voltage of the pixel electrode 11 of the pixel Pn is pushed down by ΔVd3 corresponding to the pull-in voltage ΔVd' expressed by the expression (3). In this case, since the TFT 15 has been already turned off, the so-called recharging does not occur between the source-signal line SL and the pixel electrode 11.

Even at the panel center part shown in the right half of FIG. 7, the timings related to the start of the rises and falls in each signal are similar to the case of the panel edge part. The scan signal from the scan-signal line Gn rises in the interval from time t1 to time t2. The waveform in this interval is a waveform as indicated by the solid line, which is deformed compared with the ideal waveform indicated by the dashed line. The TFT 15 of the pixel Pn is turned on in this interval, and the data signal from the source-signal line SL is written in the pixel electrode 11 and the auxiliary-capacitance electrode 12 in the pixel Pn. The voltage of the pixel electrode 11 of the pixel Pn at the time t2 is equivalent to the case of the panel edge part.

Thereafter, in the interval from time t2 to time t3, the scan signal from the scan-signal line Gn falls, and the scan signal from the scan-signal line Gn+1 rises. The waveform in this interval is a waveform as indicated by the solid line, which is deformed compared with the ideal waveform indicated by the dashed line. In this interval, the voltage of the pixel electrode 11 of the pixel Pn is pushed down by a voltage corresponding to the pull-in voltage ΔVd expressed by the expression (2) due to the influence of the parasitic capacitance Cgd shown in FIG. 6. At the same time, the voltage of the pixel electrode 11 of the pixel Pn is pushed up by a voltage corresponding to the pull-in voltage ΔVd' expressed by the expression (3) due to the influence of the parasitic capacitance Cgp shown in FIG. 6. Since the above-mentioned voltage push-down and voltage push-up cancel out each other, the variation in the voltage of the pixel electrode 11 is suppressed.

In the beginning of the interval from time t2 to time t3, since the TFT 15 of the pixel Pn is slowly turned from ON to OFF, recharging between the signal line for the data signal and the pixel electrode 11 may occur. However, since the voltage of the pixel electrode 11 is maintained approximately equal to the voltage of the data signal, the voltage of the pixel electrode 11 is not affected by the recharging.

Thereafter, in the interval from time t3 to time t4, the scan signal from the scan-signal line Gn+1 falls. The waveform in this interval is also a deformed waveform as indicated by the solid line. In this interval, the voltage of the pixel electrode 11 of the pixel Pn is pushed down by a voltage ΔVd3 corresponding to the pull-in voltage ΔVd' expressed by the expression (3) due to the influence of the parasitic capacitance Cgp shown in FIG. 6. However, the TFT 15 has been already turn d off as in the case of the panel edge part, therefore recharging does not occur.

As described above, Embodiment 1 is configured such that the scan signal from the scan-signal line Gn+1 (hereinafter referred to as the signal B) rises when the scan signal from the scan-signal line Gn (hereinafter referred to as the signal A) falls. Ideally, it is configured that the signal B rises when the signal A has fallen or at the time of the fall of the signal A. However, the time when the signal A has fallen or the time of the fall of the signal A may not precisely coincide with the time of the rise of the signal B.

Considering the finite rising time and the finite falling time, preferably, it is configured such that the signal B starts to rise between the time when the signal A starts to fall and the time when the signal A completes falling, regardless of the position on the panel. Further, taking into account the fact that recharging between the source-signal line SL and the pixel electrode 11 may occur between the time when the signal A starts to fall and the time when the voltage of the signal A falls below a voltage higher than the voltage of the data signal by the threshold level of the TFT 15, further preferably, it is configured such that the signal B starts to rise between the time when the signal A starts to fall and the time when the above-mentioned recharging is completed.

On the other hand, when the time for start of the rise of the signal B precedes the time for start of the fall of the signal A, the signal B rises while the pixel electrode 11 is connected to the source-signal line SL by the TFT 15 and is in a low-impedance state. Therefore, no push-up for the voltage of the pixel electrode 11 occurs. Resultantly, push-down for the voltage of the pixel electrode 11 occurs at the time of the subsequent fall of the signal A and the subsequent fall of the signal B, so that a pull-in voltage of approximately twice the magnitude ΔVd3 shown in FIG. 7 occurs, and the magnitude of the pull-in voltage varies with the position on the panel. Thus, it is undesirable that the start of the rise of the signal B precedes the start of the fall of the signal A.

As described above, according to Embodiment 1, the pixels P, P, - - - arrayed in a form of a matrix are each defined so as to include an electrode pair consisting of the pixel electrode 11 and the counter electrode 21 facing one another via the liquid-crystal layer 3; and the scan signal is applied, from the scan-signal line Gn, Gn+1, - - - for each line, to the gate electrode of the TFT 15 for applying the data signal to the pixel electrode 11 included in the pixels P, P, - - - . In addition, the signal which is raised when the scan signal for each line falls is applied to the signal line arranged between a pixel P in each line and a pixel P adjacent thereto at one side in a line direction.

Therefore, the push-down for the voltage due to the pull-in voltage which occurs in the pixel electrode 11 when the scan signal falls and the push-up for the voltage which occurs in the pixel electrode 11 due to the same principle as the pull-in voltage when the signal from the signal line rises cancel out each other.

Thus, it is possible to prevent the optimum voltage for the counter electrode 21 facing the pixel electrode 11 from deviating from a preset counter voltage, and prevent emergence of a distribution of the effective voltages of the pixel electrodes.

In addition, according to Embodiment 1, the scan signal for the next line is applied to the signal line for each line. Specifically, the signal line arranged between each line and the preceding line thereof is the scan-signal line for each line, and the signal line arranged between each line and the next line thereof is the scan-signal line for the next line.

Therefore, it is possible to substitute the scan signal for the signal to be applied to the signal line, by configuring the scan signals so that when the scan signal for each line falls, the scan signal for the next line of each line rises.

Variation

Embodiment 1 is an embodiment in which gate drivers GDa are each arranged at the right edge and left edge of the liquid-crystal panel 100a. On the other hand, in a variation of Embodiment 1, gate drivers GDa1 and GDa2 are arranged in the vertical direction at each of the right and left edges of the liquid-crystal panel 100a.

Figure 8:
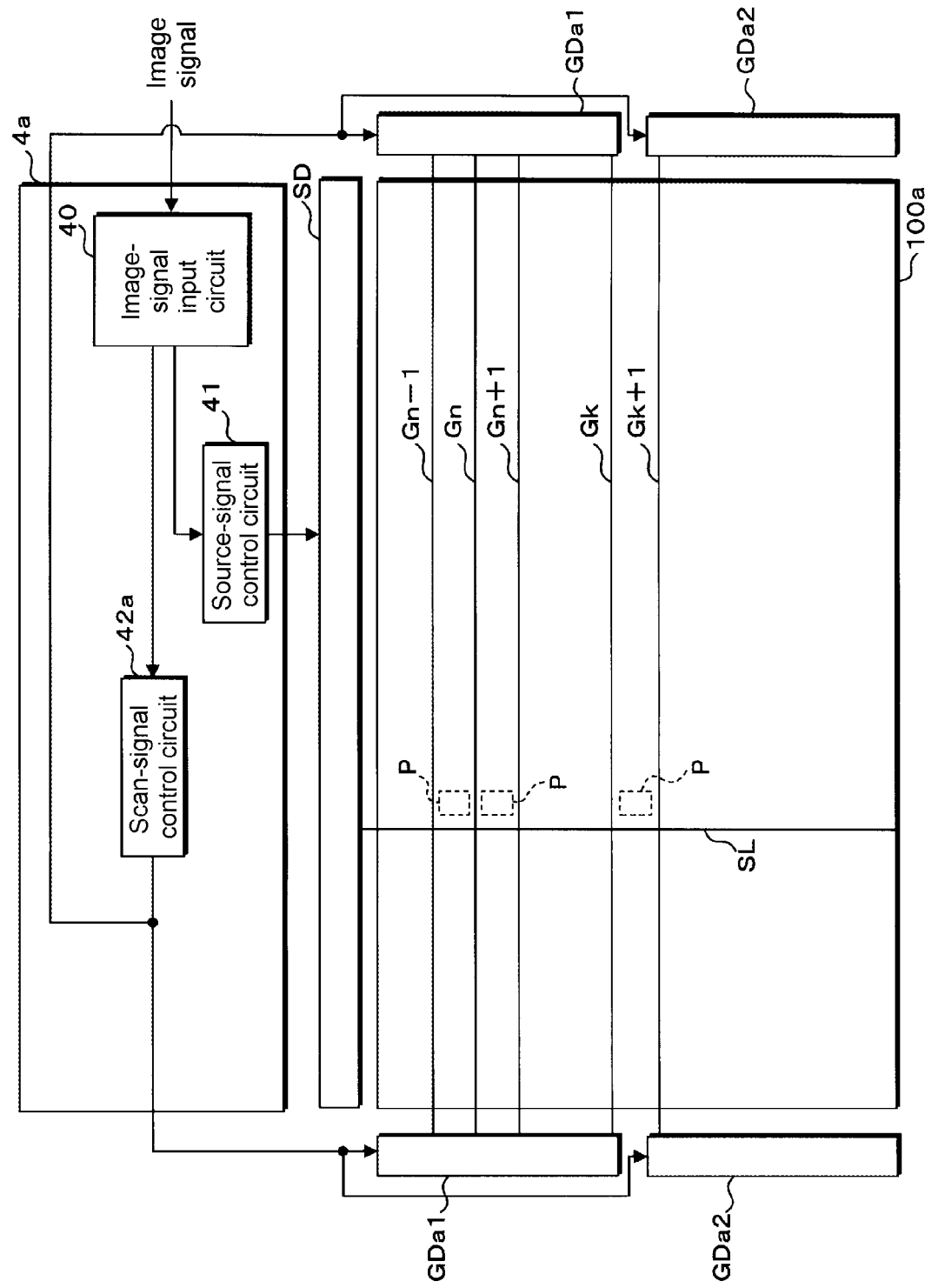
FIG. 8 is a block diagram showing an example of a configuration of a liquid-crystal display apparatus according to a variation of Embodiment 1.

FIG. 8 is a block diagram showing an example of a configuration of a liquid-crystal display apparatus according to the variation of Embodiment 1. The difference of the liquid-crystal display apparatus according to the present variation from the liquid-crystal display apparatus according to Embodiment 1 is only that the gate driver GDa is divided into the gate drivers GDa1 and GDa2. The gate driver GDa may be divided into three or more gate drivers. The same reference numerals as Embodiment 1 are assigned to the portions in the variation corresponding to those in the Embodiment 1, and explanations thereof are omitted.

In the configuration shown in FIG. 8, in the case where the scan-signal line Gk to which the gate drivers GDa1 applies a scan signal and the scan-signal line Gk+1 to which the gate drivers GDa2 applies a scan signal are adjacent to each other, the timing chart showing variations with time in the signals applied to the scan-signal lines Gk and Gk+1 and the voltage of the pixel electrode 11 is obtained by replacing "Gn" and "Gn+1" in FIG. 7 with "Gk" and "Gk+1", respectively. If a slight difference occurs between the signal driving characteristics of the gate drivers GDa1 and GDa2 or between the propagation delay characteristics of the scan-signal lines Gk and Gk+1, at the panel center part, the time for start of the fall of the scan signal (hereinafter referred to as signal C) from the scan-signal line Gk with which Gn in FIG. 7 has been replaced may be delayed from the time for start of the rise of the scan signal (hereinafter referred to as signal D) from the scan-signal line Gk+1.

As described in Embodiment 1, it is undesirable that the time for start of the fall of the signal C is delayed from the time for start of the rise of the signal D. In addition, when the fall of the signal C and the rise of the signal D are reversed to one another with respect to time, a horizontal streak may be observed at the position corresponding to the boundary between the gate drivers GDa1 and GDa2, on the display screen of the panel.

Therefore, in the present variation, the time for start of the fall of the signal C is advanced by a certain time with respect to the time for the start of the rise of the signal D. Specifically, the signal width of the scan signal is set shorter than "1H" by the certain time. It is preferable that the certain time should be the maximum of the difference in the propagation delay time between the adjacent scan-signal lines.

As described above, according to the present variation, regardless of the difference in the propagation delay time between the scan signals in the respective scan-signal lines, it is possible to make the push-down for the voltage due to the pull-in voltage and the push-up for the voltage cancel each other out. Here, the pull-in voltage occurs in the pixel electrode 11 when the scan signal falls, and the push-up for the voltage occurs in the pixel electrode 11 when the scan signal from the scan-signal line for the next line rises.

Embodiment 2

Embodiment 1 is an embodiment in which each pixel P is defined so as to include an electrode pair consisting of the pixel electrode 11 and the counter electrode 21 facing each other via the liquid-crystal layer 3. On the other hand, Embodiment 2 is an embodiment in which each pixel P includes at least two subpixels each defined so as to include an electrode pair consisting of a subpixel electrode and a counter electrode facing each other via the liquid-crystal layer 3.

Figure 9:
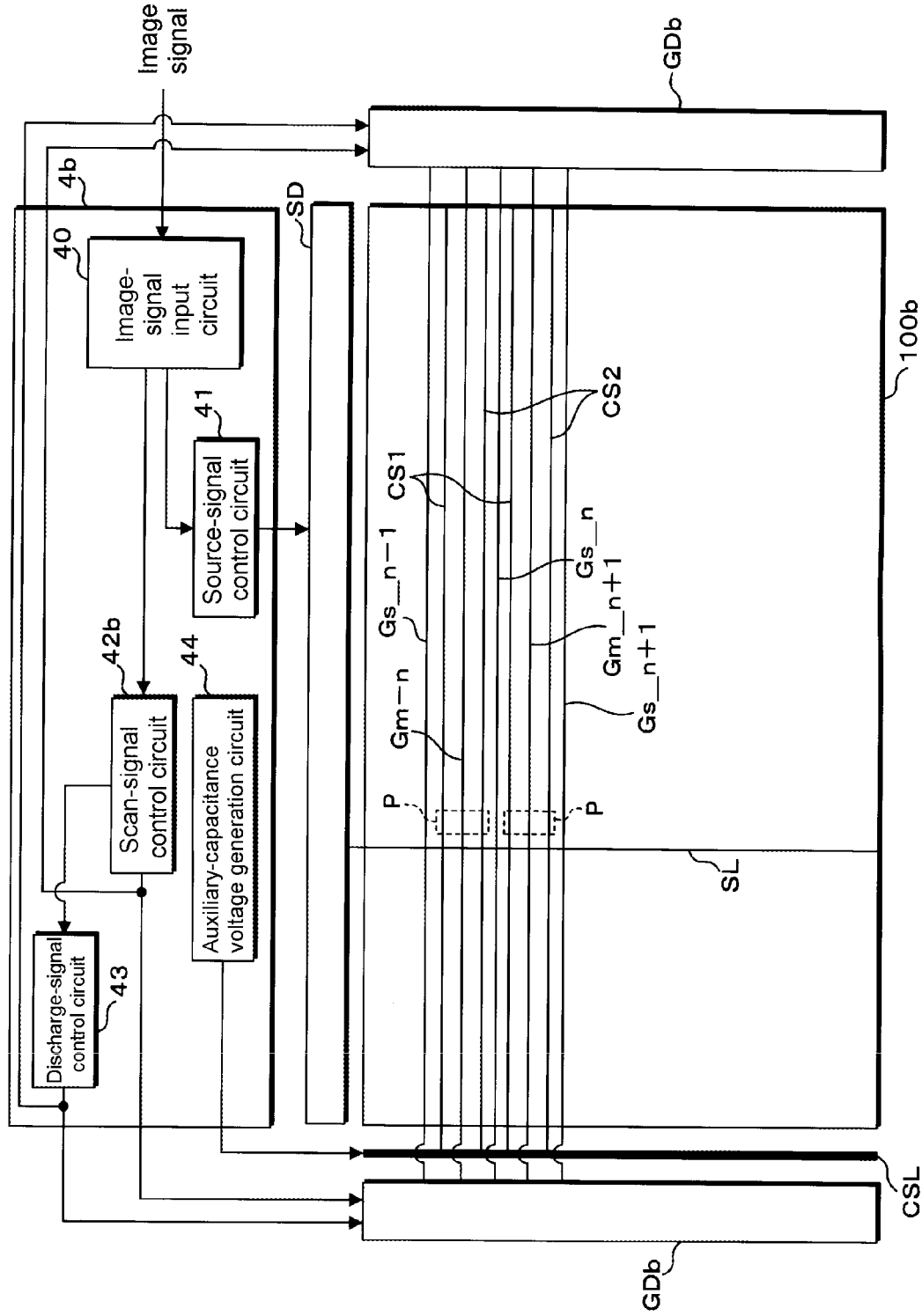
FIG. 9 is a block diagram showing an example of a configuration of a liquid-crystal display apparatus according to Embodiment 2 of the present invention.
Figure 10:
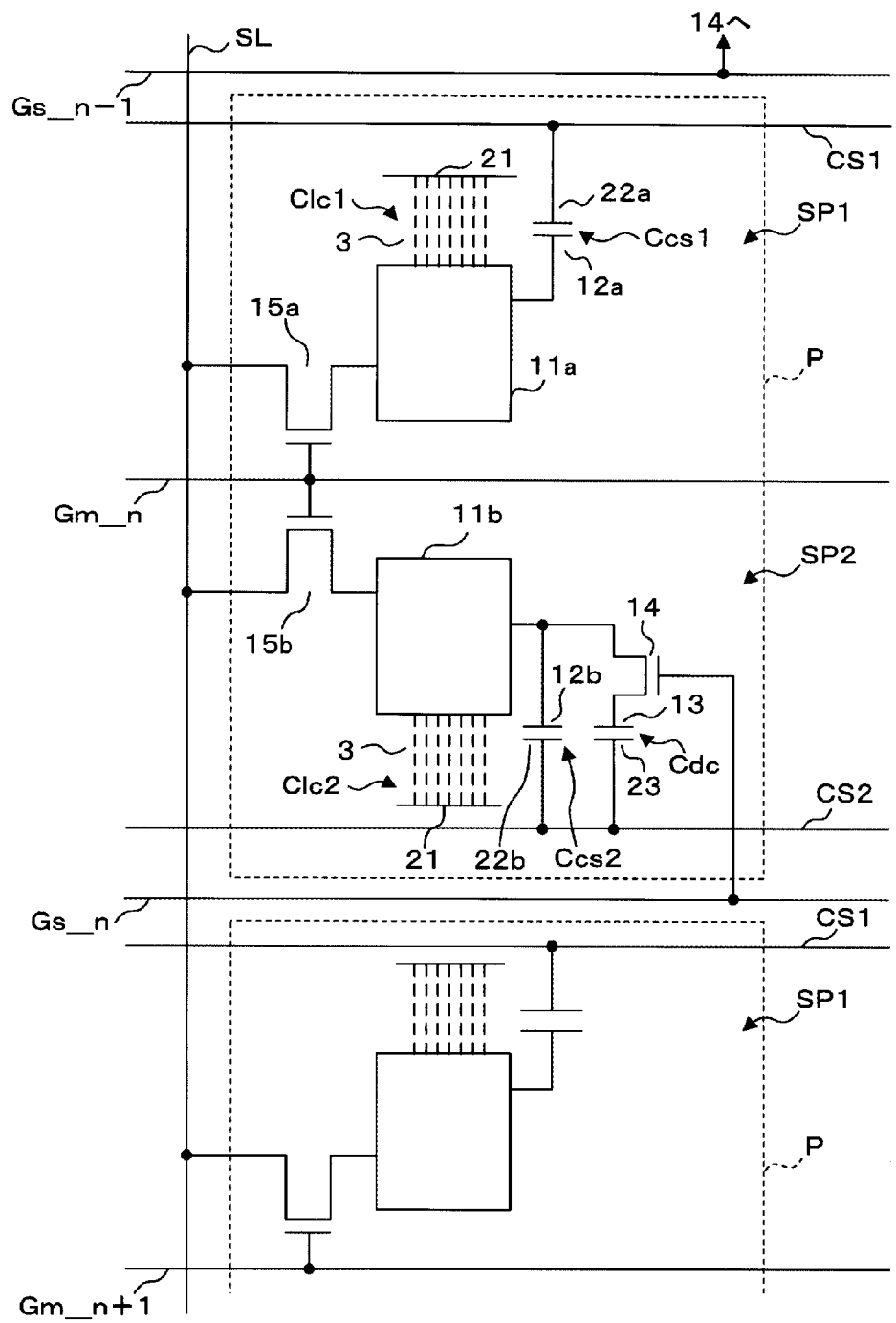
FIG. 10 is an explanation drawing schematically showing a configuration to define pixels in the liquid-crystal display apparatus according to Embodiment 2.

FIG. 9 is a block diagram showing an example of a configuration of a liquid-crystal display apparatus according to Embodiment 2 of the present invention, and FIG. 10 is an explanation drawing schematically showing a configuration to define pixels in the liquid-crystal display apparatus according to Embodiment 2. The liquid-crystal display apparatus shown in FIG. 9 includes a liquid-crystal panel 100b in which pixels P each including at least two subpixels (each of which is defined so as to include an electrode pair) are arrayed in a form of a matrix in the vertical direction (row direction) and the horizontal direction (column direction) of the display screen. FIG. 9 representatively shows two pixels P consecutively arrayed in the row direction on the liquid-crystal panel 100b and signal lines related to these pixels P. Hereinbelow, the same reference numerals as Embodiment 1 are assigned to the components of Embodiment 2 corresponding to those in Embodiment 1, and explanations thereof are omitted or simplified.

In FIG. 10, each pixel P has at least a subpixel SP1 (corresponding to the first subpixel) and a subpixel SP2 (corresponding to the second subpixel) which are separated from each other in the vertical direction of the display screen of the liquid-crystal panel 100b. The subpixel SP1 is defined so as to include an electrode pair consisting of a subpixel electrode 11a and a counter electrode 21 facing each other via the liquid-crystal layer 3, and an electrode pair consisting of an auxiliary-capacitance electrode 12a and an auxiliary-capacitance counter electrode 22a. The drain electrode of a TFT 15a (corresponding to the first switching element) is connected to the subpixel electrode 11a. The subpixel electrode 11a and the auxiliary-capacitance electrode 12a are electrically connected to each other. The auxiliary-capacitance counter electrode 22a is connected to electric potential (corresponding to the predetermined electric potential) of an auxiliary-capacitance voltage line CS1 which is arranged to linearly and horizontally traverse one edge part in the vertical direction of the pixel P. The subpixel electrode 11a and the counter electrode 21 form a liquid-crystal capacitance Clc1. In addition, the auxiliary-capacitance electrode 12a and the auxiliary-capacitance counter electrode 22a form an auxiliary capacitance Ccs1.

The subpixel SP2 is defined so as to include an electrode pair consisting of a subpixel electrode 11b and a counter electrode 21 facing each other via the liquid-crystal layer 3, an electrode pair consisting of an auxiliary-capacitance electrode 12b and an auxiliary-capacitance counter electrode 22b, and an electrode pair consisting of a discharge-capacitance electrode 13 and a discharge-capacitance counter electrode 23. The drain electrode of a TFT 15b (corresponding to the second switching element) is connected to the subpixel electrode 11b. The subpixel electrode 11b and the auxiliary-capacitance electrode 12b are electrically connected to each other. The discharge-capacitance electrode 13 is connected to the subpixel electrode 11b through a TFT 14 (corresponding to the third switching element). The auxiliary-capacitance counter electrode 22b and the discharge-capacitance counter electrode 23 are connected to electric potential of an auxiliary-capacitance voltage line CS2 which is arranged to linearly and horizontally traverse another edge part in the vertical direction of the pixel P. The subpixel electrode 11b and the counter electrode 21 form a liquid-crystal capacitance Clc2. The auxiliary-capacitance electrode 12b and the auxiliary-capacitance counter electrode 22b form an auxiliary capacitance Ccs2. In addition, the discharge-capacitance electrode 13 and the discharge-capacitance counter electrode 23 form a discharge capacitance Cdc.

The counter electrode 21 is common to the subpixels SP1 and SP2. However, the counter electrode 21 is not limited to this arrangement. The auxiliary-capacitance counter electrodes 22a and 22b and the discharge-capacitance counter electrode 23 may be connected to the counter electrode 21 similarly to Embodiment 1. The area ratio of the subpixel electrode 11a and the subpixel electrode 11b is not limited to 1:1, and the number of the subpixels is not limited to two.

A source-signal line SL for applying a source signal (corresponding to the data signal) to the subpixel electrodes 11a and 11b respectively through the TFTs 15a and 15b is linearly arranged along the vertical direction at one lateral part of the pixel P in the horizontal direction. The source electrodes of the TFTs 15a and 15b are connected to the source-signal line SL. The gate electrodes (each corresponding to the control electrode) of the TFT 15a and TFT 15b of the pixel P in the nth line are connected to a scan-signal line Gm_n which is linearly arranged to horizontally traverse the center part of the pixel P. The gate electrode of the TFT 14 is connected to a discharge-signal line Gs_n which is linearly arranged to horizontally extend between the pixel P in the nth line and the pixel P in the next line (i.e. the (n+1)th line) which are adjacent to each other in the vertical direction (row direction). The scan-signal line Gm_n and the discharge-signal lines Gs_n−1, Gs_n, Gs_n+1, - - - are arranged, for each row, in parallel in the row direction of the matrix.

Referring to FIG. 9, the liquid-crystal display apparatus according to Embodiment 2 further includes gate drivers GDb, GDb, a source driver SD, an auxiliary-capacitance voltage main wiring CSL, and a display control circuit 4b. The gate drivers GDb, GDb apply scan signal to scan-signal lines Gm_n−1, Gm_n, Gm_n+1, - - - and apply discharge signal to the discharge-signal lines Gs_n−1, Gs_n, Gs_n+1, - - - . The source driver SD applies source signal to the source-signal lines SL, SL, - - - . The auxiliary-capacitance voltage main wiring CSL is included for relaying voltage to be applied to the auxiliary-capacitance voltage lines CS1 and CS2. The display control circuit 4b controls displaying with the liquid-crystal panel 100b by using gate drivers GDb, GDb, the source driver SD, and the auxiliary-capacitance voltage main wiring CSL. The auxiliary-capacitance voltage main wiring CSL may be arranged in the liquid-crystal panel 100b.

The display control circuit 4b includes an image-signal input circuit 40, a scan-signal control circuit 42b, a discharge-signal control circuit 43, a source-signal control circuit 41, and an auxiliary-capacitance voltage generation circuit 44. The scan-signal control circuit 42b, the discharge-signal control circuit 43, and the source-signal control circuit 41 respectively control the gate drivers GDb, GDb and the source driver SD on the basis of a clock signal and a synchronization signal which are separated from each other by the image-signal input circuit 40. The auxiliary-capacitance voltage generation circuit 44 generates a predetermined voltage which is to be applied to the auxiliary-capacitance voltage lines CS1 and CS2 through the auxiliary-capacitance voltage main wiring CSL. Although the predetermined voltage to be applied to the auxiliary-capacitance voltage lines CS1 and CS2 is common, the predetermined voltage is not limited to such a configuration. For example, different voltages may be applied to these voltage lines, or a signal in which the voltage varies periodically may be applied.

The scan-signal control circuit 42b, the discharge-signal control circuit 43, and the source-signal control circuit 41 each generate control signals such as a start signal, a clock signal, and an enable signal, which are needed for periodic operations of the gate drivers GDb, GDb and the source driver SD. The gate drivers GDb, GDb, within one frame period of the image data, apply a scan signal to the scan-signal lines Gm_n−1, Gm_n, Gm_n+1, - - - sequentially for each horizontal scan period, and apply a discharge signal to the discharge-signal lines Gs_n−1, Gs_n, Gs_n+1, - - - sequentially for each horizontal scan period.

The scan signal which has been applied to one of the scan-signal lines Gm_n−1, Gm_n, Gm_n+1, - - - is applied to the gate electrodes of the TFTs 15a and 15b which are included in each of the pixels P, P, - - - for one line, the pixels being arranged in the column direction. In addition, a discharge signal is applied, from one of the discharge signal lines Gs_n−1, Gs_n, Gs_n+1, to the gate electrodes of the TFTs 14 included in the respective pixels P, P, - - - for the one line mentioned above. In Embodiment 2, when the scan signal for each line falls, the discharge signal for the preceding line rises. In order to obtain the above-mentioned time relation, the signal width of the scan signal is adjusted by the scan-signal control circuit 42b, and the delay time of the discharge signal with respect to the scan signal in each line is adjusted by the discharge-signal control circuit 43.

In one horizontal scan period in which a scan signal is applied to one scan-signal line Gm_n, the source signals which have been applied to the source-signal lines SL, SL, - - - are each applied to the pixel electrodes 11a and 11b through the TFT 15a and 15b of which gate electrodes are connected to the one scan-signal line Gm_n, as well as to the auxiliary-capacitance electrodes 12a and 12b. Therefore, the source signal is written in the liquid-crystal capacitances Clc1 and Clc2 (respectively formed in the subpixels SP1 and SP2) and the auxiliary capacitances Ccs1 and Ccs2 (respectively formed in the subpixels SP1 and SP2). In this way, the source signals for one line are simultaneously written in the pixels P, P, - - - for one line in one horizontal scan period. The source signals written in the subpixels SP1 and SP2 are held for one frame period, unless the each combined capacitances are changed.

The optical configuration of the liquid-crystal panel 100b is similar to the configuration of Embodiment 1 shown in FIG. 5. It is appreciated that the TFTs 15 and 15b, the subpixel electrodes 11a and 11b, the auxiliary-capacitance electrodes 12a and 12b, the auxiliary-capacitance counter electrodes 22a and 22b, the discharge-capacitance electrode 13, the discharge-capacitance counter electrode 23, and the TFT 14 are included in the layer in which the TFT 15, the pixel electrode 11, the auxiliary-capacitance electrode 12, and the auxiliary-capacitance counter electrode 22 are included in Embodiment 1.

Next, parasitic capacitances, which are not explicitly shown in FIG. 10, are described.

Figure 11:
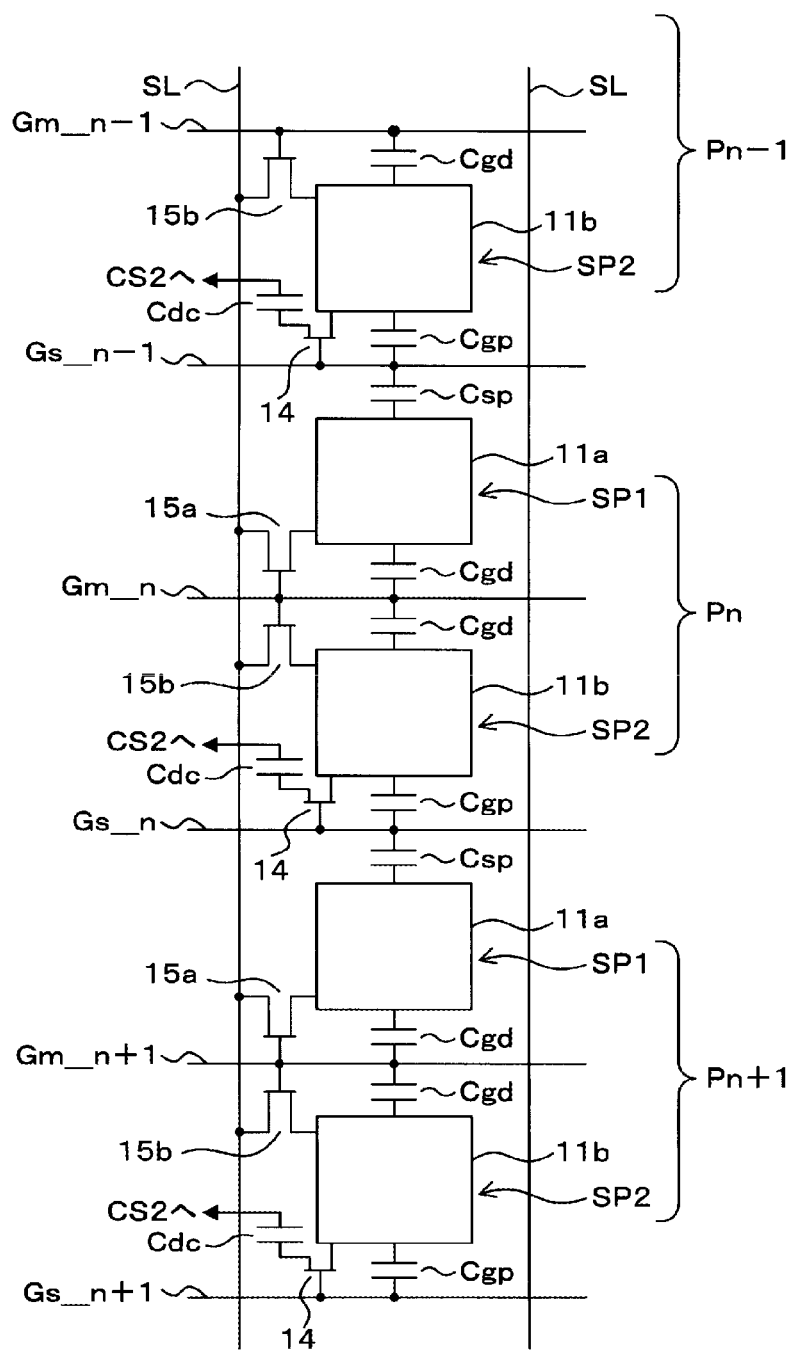
FIG. 11 is an explanation drawing for explaining parasitic capacitances accompanying pixels in the liquid-crystal display apparatus according to Embodiment 2.

FIG. 11 is an explanation drawing for showing parasitic capacitances accompanying the pixels P in the liquid-crystal display apparatus according to Embodiment 2. In FIG. 11, for later explanations, a pixel in the nth line is denoted by Pn. Since the parasitic capacitances similarly accompany any of the pixels Pn−1, Pn, and Pn+1, the following explanations are focused on the pixel Pn.

In the TFTs 15a and 15b of which drain electrodes are connected to the subpixel electrodes 11a and 11b of the respective subpixels SP1 and SP2, a parasitic capacitance exists between the drain and the gate. In addition, a stray capacitance exists between the scan-signal line Gm_n connected to the gate electrodes of the TFTs 15a, 15b and each of the subpixel electrodes 11a, 11b. Since the above parasitic capacitance between the drain and the gate and the stray capacitance behave as parallel capacitances, these capacitances are collectively referred to as the parasitic capacitance Cgd.

In the TFT 14 of which drain electrode (or source electrode) is connected to the subpixel electrode 11b of the subpixel SP2, a parasitic capacitance exists between the drain and the gate (or between the source and the gate). In addition, a stray capacitance exists between the discharge-signal line Gs_n connected to the gate electrode of the TFT 14 and the subpixel electrode 11b. Since the above parasitic capacitance between the drain and the gate (or between the source and the gate) and the stray capacitance behave as parallel capacitances, these capacitances are collectively referred to as the parasitic capacitance Cgp. Further, a stray capacitance exists between the subpixel electrode 11a of the subpixel SP1 and the discharge-signal line Gs_n−1. This stray capacitance is referred to as the parasitic capacitance Csp.

Hereinbelow, specific examples in which the problem of the present application is solved are described.

Figure 12:
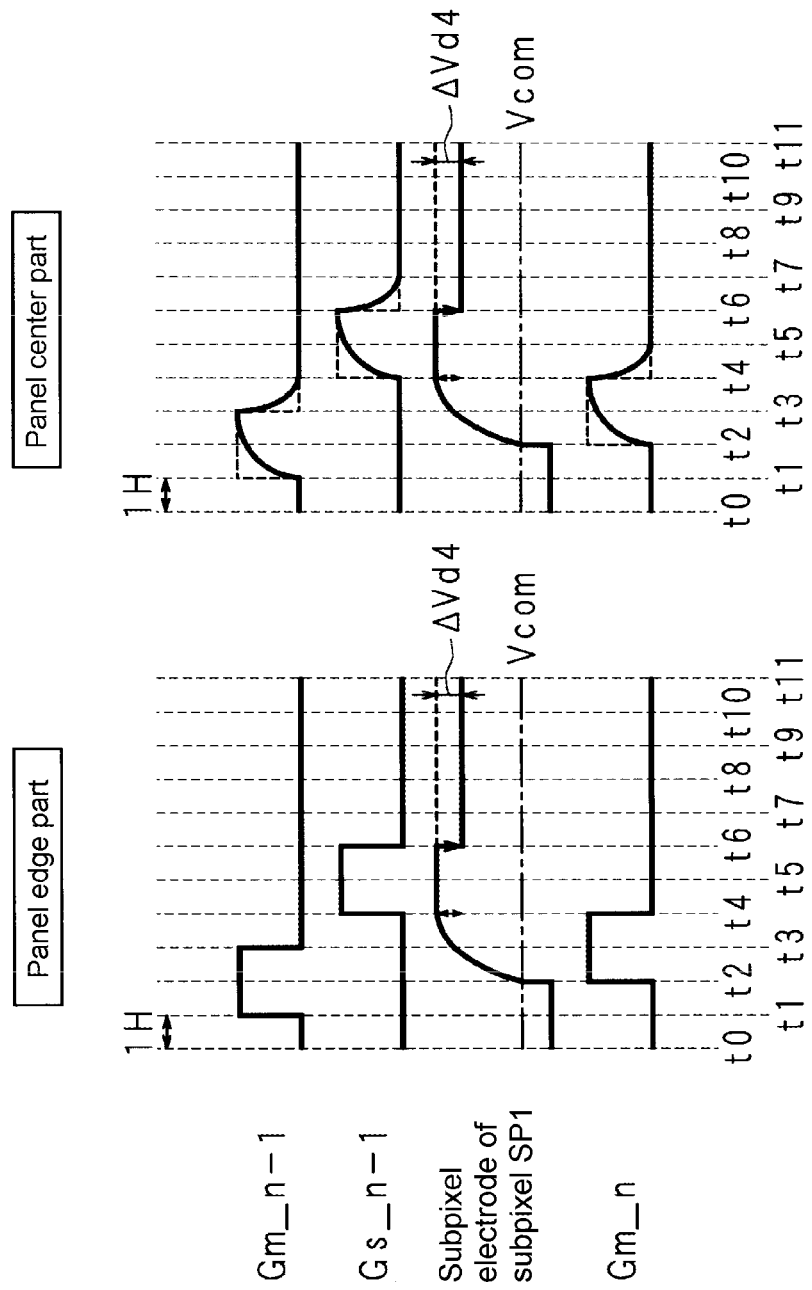
FIG. 12 is a timing chart showing variations with time in the voltages of signals applied to scan-signal lines and discharge-signal lines and the voltages of subpixel electrodes in the liquid-crystal display apparatus according to Embodiment 2.

FIG. 12 is a timing chart showing variations with time in the voltages of signals applied to scan-signal lines and discharge-signal lines and variations with time in the voltages of the subpixel electrode 11a in the liquid-crystal display apparatus according to Embodiment 2. The uppermost, upper middle, lower middle, and lowermost parts of FIG. 12 respectively show the signal level in the scan-signal line Gm_n−1 in the (n−1)th line, the signal level in the discharge-signal line Gs_n−1 in the (n−1)th line, the voltage of the subpixel electrode 11a of the subpixel SP1 in the pixel Pn, and the signal level in the scan-signal line Gm_n in the nth line, for the panel edge part and the panel central part in the direction along the scan-signal lines. The abscissa indicates time. Regarding the signal levels, the positive pulses indicate ON states. The intervals between the vertical dashed lines are "1H". The horizontal dash-dot line indicates the electric potential of the counter voltage Vcom. Although the polarity of the voltage waveform of the subpixel electrode 11a is inverted with respect to Vcom after one frame so as to be negative, FIG. 12 representatively shows the case where a positive data signal is written.

At the panel edge part shown in the left half of FIG. 12, the scan signals from the respective scan-signal lines Gm_n−1 and Gm_n have been generated so as to have the signal width of "2H" and the time difference of "1H" from each other. In addition, the discharge signal from the discharge-signal line Gs_n−1 in the (n−1)th line is generated to have the signal width of "2H" and be delayed by "3H" from the scan signal from the scan-signal line Gm_n−1 in the same line. When the scan signal from the scan-signal line Gm_n rises to the ON state at time t2, the TFT 15a of the pixel Pn is turned on (into the conductive state), and the data signal from the source-signal line SL is applied to the subpixel electrode 11a and the auxiliary-capacitance electrode 12a (See FIG. 10) of the subpixel SP1 in the pixel Pn. Thus, the voltage of the subpixel electrode 11a reaches to the same level as the voltage of the source-signal line SL in the interval from time t2 to time t4, so that the data signal is written in the subpixel electrode 11a. This voltage becomes the voltage which is applied to the liquid-crystal capacitance Clc1.

Focusing on the subpixel SP2 in the pixel Pn−1, the discharge signal from the discharge-signal line Gs_n−1 which turns on the TFT 14 of the subpixel SP2 does not overlap the scan signal from the scan-signal line Gm_n−1. Therefore, the voltage of the subpixel electrode 11*b* of the subpixel SP2 in the pixel Pn−1 reaches to the same level as the source-signal line SL in the interval from time t1 to time t3, and after the TFT 15*b* turns off, the TFT 14 turns on, so that the discharge capacitance Cdc is connected in parallel with the liquid-crystal capacitance Clc2 and the auxiliary-capacitance Ccs2 (See FIG. 10).

In this case, the electric charge stored in the discharge capacitance Cdc is the electric charge stored one frame before, and has a polarity opposite to the polarity of the electric charge stored in the liquid-crystal capacitance Clc2 and the auxiliary-capacitance Ccs2. Therefore, in the interval from time t4 to time t6, a positive electric charge (or a negative electric charge) moves from the liquid-crystal capacitance Clc2 and the auxiliary-capacitance Ccs2 to the discharge capacitance Cdc, so that the absolute value of the voltage applied to the liquid-crystal capacitance Clc2 is lowered. On the other hand, the voltage applied to the liquid-crystal capacitance Clc1 is not affected by the turn-on of the TFT 14. Therefore, the absolute value of the voltage applied to the liquid-crystal capacitance Clc2 becomes smaller than the absolute value of the voltage applied to the liquid-crystal capacitance Clc1, and a difference in luminance occurs between the subpixels SP1 and SP2 so that the effect of improvement in viewing angle dependency (or viewing field angle dependency) of the gamma characteristic is obtained. Since such an effect is described in detail, for example, in JP 2004-062146 A, explanation of the effect is omitted here.

Thereafter, when the scan signal from the scan-signal line Gm_n falls to the OFF state at time t4, the TFT 15*a* of the pixel Pn is turned off (into the nonconductive state). At time t4, the voltage of the subpixel electrode 11*a* of the subpixel SP1 in the pixel Pn is pushed down by the pull-in voltage due to the influence of the parasitic capacitance Cgd. When the capacitance of each pixel P (which corresponds to the sum of the liquid-crystal capacitance Clc1, the auxiliary capacitance Ccs1, the parasitic capacitances Cgd, Csp shown in FIG. 11, and the parasitic capacitance Csd between the source and the drain of the TFT 15*a*) is denoted by Cpix1, the pull-in voltage ΔVd due to Cgd is expressed by the following expression (4).

$$\Delta Vd = (Cgd/Cpix1) \times (VgH - VgL) \quad (4)$$

As described above, Embodiment 2 is configured such that the discharge signal from the discharge-signal line Gs_n−1 corresponding to the line preceding the line including the pixel Pn is raised at time t4. Therefore, at time t4, the voltage of the subpixel electrode 11*a* of the pixel Pn is pushed up by a voltage corresponding to the pull-in voltage due to the influence of the parasitic capacitance Csp shown in FIG. 11. The voltage corresponding to the pull-in voltage ΔVd' at this time is expressed by the following expression (5).

$$\Delta Vd'' = (Csp/Cpix1) \times (VgH - VgL) \quad (5)$$

When the magnitudes of the parasitic capacitances Cgd and Csp are approximately equal, the voltage ΔVd expressed by the expression (4) is canceled out by the voltage ΔVd" expressed by the expression (5). That is, since the voltage of the subpixel electrode 11*a* of the pixel Pn is approximately equally affected by the voltage push-down due to the fall of the scan signal from the scan-signal line Gm_n and the voltage push-up due to the rise of the discharge signal from the discharge-signal line Gs_n−1, the voltage of the subpixel electrode 11*a* of the pixel Pn is maintained at approximately the voltage not affected by the above-mentioned signals at all. Thereafter, when the discharge signal from the discharge-signal line Gs_n−1 falls at time t6, the voltage of the subpixel electrode 11*a* of the pixel Pn is pushed down by an amount ΔVd4 corresponding to the pull-in voltage ΔVd' expressed by the expression (5). In this case, since the TFT 15*a* has been already turned off, recharging does not occur.

Even at the panel center part shown in the right half of FIG. 12, the timings related to the start of the rises and falls in each signal are similar to the case of the panel edge part. The scan signal from the scan-signal line Gm_n rises in the interval from time t2 to time t4. The waveform in this interval is a waveform as indicated by the solid line, which is deformed compared with the ideal waveform indicated by the dashed line. The TFT 15*a* of the pixel Pn is turned on in this interval, and the data signal from the source-signal line SL is written in the subpixel electrode 11*a* and the auxiliary-capacitance electrode 12*a* in the pixel Pn. The voltage of the subpixel electrode 11*a* of the pixel Pn at the time t4 is equivalent to the case of the panel edge part.

Thereafter, in the interval from time t4 to time t6, the scan signal from the scan-signal line Gm_n falls, and the discharge signal from the discharge-signal line Gs_n−1 rises. The waveform in this interval is a waveform as indicated by the solid line, which is deformed compared with the ideal waveform indicated by the dashed line. In this interval, the voltage of the subpixel electrode 11*a* of the pixel Pn is pushed down by a voltage corresponding to the pull-in voltage ΔVd expressed by the expression (4) due to the influence of the parasitic capacitance Cgd shown in FIG. 11. At the same time the voltage of the subpixel electrode 11*a* of the pixel Pn is pushed up by a voltage corresponding to the pull-in voltage ΔVd' expressed by the expression (5) due to the influence of the parasitic capacitance Csp shown in FIG. 11. Since the above-mentioned voltage push-down and voltage push-up cancel out each other, the variation in the voltage of the subpixel electrode 11*a* is suppressed.

In the beginning of the interval from time t4 to time t6, since the TFT 15*a* of the pixel Pn is slowly turned from ON to OFF, recharging between the signal line for the data signal and the subpixel electrode 11*a* may occur. However, since the voltage of the subpixel electrode 11*a* is maintained approximately equal to the voltage of the data signal, the voltage of the subpixel electrode 11*a* is not affected by the recharging.

Thereafter, in the interval from time t6 to time t8, the discharge signal from the discharge-signal line Gs_n−1 falls. The waveform in this interval is also a deformed waveform as indicated by the solid line. In this interval, the voltage of the subpixel electrode 11*a* of the pixel Pn is pushed down by the amount ΔVd4 corresponding to the pull-in voltage ΔVd' expressed by the expression (5) due to the influence of the parasitic capacitance Csp shown in FIG. 11. However, the TFT 15*a* has been already turned off as in the case of the panel edge part, therefore recharging does not occur.

As described above, Embodiment 2 is configured such that the discharge signal from the discharge-signal line Gs_n−1 (hereinafter referred to as the signal F) rises when the scan signal from the scan-signal line Gm_n (hereinafter referred to as the signal E) falls. Ideally, it is configured that the signal F rises when the signal E has fallen or at the time of the fall of the signal E. However, the time when the signal E has fallen or the time of the fall of the signal E may not precisely coincide with the time of the rise of the signal F.

Considering the finite rising time and the finite falling time, preferably, it is configured such that the signal F starts to rise between the time when the signal E starts to fall and the time when the signal E completes falling, regardless of the position on the panel. Further, taking into account the fact that recharging between the source-signal line SL and the subpixel electrode 11a may occur between the time when the signal E starts to fall and the time when the voltage of the signal E falls below a voltage higher than the voltage of the data signal by the threshold level of the TFT 15a, further preferably, it is configured such that the signal F starts to rise between the time when the signal E starts to fall and the time when the above-mentioned recharging is completed.

On the other hand, when the time for start of the rise of the signal F precedes the time for start of the fall of the signal E, the signal F rises while the subpixel electrode 11a is connected to the source-signal line SL by the TFT 15a and is in a low-impedance state. Therefore, no push-up for the voltage of the subpixel electrode 11a occurs. Resultantly, push-down for the voltage of the subpixel electrode 11a occurs at the time of the subsequent fall of the signal E and the subsequent fall of the signal F, so that a pull-in voltage of approximately twice the magnitude ΔVd4 shown in FIG. 12 occurs, and the magnitude of the pull-in voltage varies with the position on the panel. Thus, it is undesirable that the start of the rise of the signal F precedes the start of the fall of the signal E.

In addition, in the case where the gate driver GDb is separated into more than one piece, as in the case of the variation of Embodiment 1, it is preferable that the time for start of the fall of the signal E should be advanced with respect to the time for start of the rise of the signal F by the maximum of the difference in the propagation delay time between the adjacent scan-signal lines.

Hereinbelow, results of measurement of deviations of the counter voltages within the display screen of the liquid-crystal panel 100b are explained.

Figure 13:
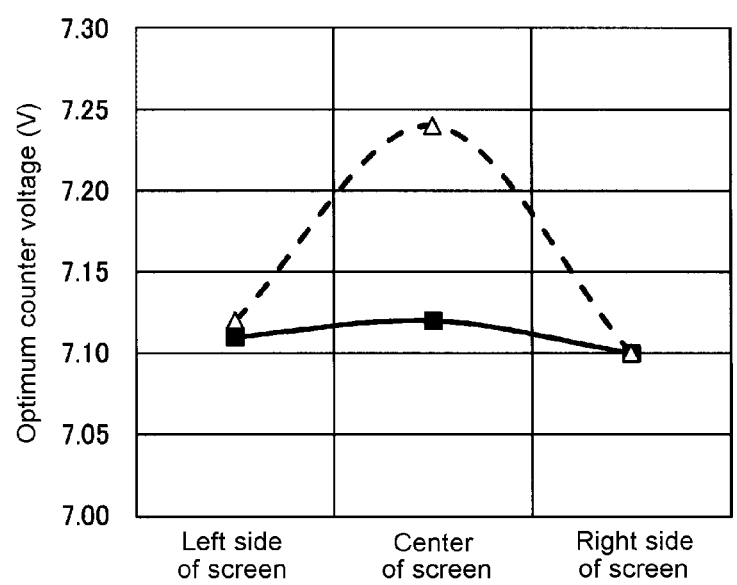
FIG. 13 is a graph showing a relation between the display position on a display screen and an optimum counter voltage.

FIG. 13 is a graph showing a relation between the display position on the display screen and the optimum counter voltage. In FIG. 13, the abscissa indicates the distance from the left edge of the panel, and the ordinate indicates the optimum counter voltage (V). The liquid-crystal display apparatus used for the measurement has the size of 60 inches, the resolution of 4K, the frame rate of 120 Hz, and the horizontal scan period (1H) of 3.7 μs. The solid line indicates variation in the optimum counter voltage in the liquid-crystal display apparatus according to Embodiment 2, and the dashed line indicates variation in the optimum counter voltage in a conventional liquid-crystal display apparatus for comparison.

In the liquid-crystal display apparatus according to Embodiment 2, the optimum counter voltages in the left side, center, and right side of the screen are respectively 7.11V, 7.12V, and 7.10V, that is, the variation range falls within a range of 0.02V. On the other hand, in the conventional liquid-crystal display apparatus, the optimum counter voltages in the left side, center, and right side of the screen are respectively 7.12V, 7.24V, and 7.10V, i.e., the variation range increases to 0.14V.

As described above, the liquid-crystal display apparatus according to Embodiment 2 achieves the effect of making the optimum counter voltage approximately constant over the display screen. The graph of the optimum counter voltage in FIG. 13 shows the characteristic in the case where the time for start of the fall of the above signal E coincides with the time for start of the rise of the signal F. Further, in the case where the gate driver GDb is separated into more than one piece, a result that the graph of the optimum counter voltage comes close to flat has been obtained when the time for start of the fall of the signal E is advanced by 0.5 μs with respect to the time for start of the rise of the signal F.

As described above, according to Embodiment 2, the pixels P, P, - - - arrayed in a form of a matrix each includes at least the subpixel SP1 and the subpixel SP2 defined so as to respectively include an electrode pair consisting of the counter electrode 21 and the subpixel electrode 11a facing one another via the liquid-crystal layer 3 and an electrode pair consisting of the counter electrode 21 and the subpixel electrode 11b facing one another via the liquid-crystal layer 3. Scan signals from scan-signal lines Gm_n, Gm_n+1, - - - for respective lines are applied to the gate electrodes of the TFTs 15a and 15b for applying a data signal to the subpixel electrodes 11a and 11b respectively included in the first subpixel SP1 and the second subpixel SP2. The discharge-capacitance electrode 13 is connected to the subpixel electrode 11b of the second subpixel SP2 through the TFT 14. The gate electrode of the TFT 14 is connected to a signal line for the next line, i.e., the discharge-signal line Gs_n, Gs_n+1, - - - for each line, and the discharge-capacitance counter electrode 23, connected to the predetermined electric potential, faces the discharge-capacitance electrode 13. In addition, a discharge signal, which rises to turn on the TFT 14 after the scan signal falls, is applied to the gate electrode of the TFT 14 for each line.

Therefore, the first subpixel SP1 included in the pixel P in the nth line and the second subpixel SP2 included in the pixel Pn−1 in the preceding line are arranged adjacent to each other via a discharge-signal line Gs_n−1, Gs_n, - - - for the preceding line, and it is configured that the discharge signal for the preceding line rises when the scan signal for the nth line falls. Thereby, the push-down for the voltage due to the pull-in voltage which occurs in the subpixel electrode 11a of the first subpixel SP1 when the scan signal for the nth line falls and the push-up for the voltage which occurs in the subpixel electrode 11a of the first subpixel SP1 due to the same principle as the pull-in voltage when the discharge signal for the preceding line rises can cancel out each other.

Further, according to Embodiment 1 or 2, the polarity of the data signal applied to each pixel P is inverted for each frame, therefore, application of DC voltage to the liquid-crystal layer 3 can be prevented. In Embodiment 2 in which pixel P has the first subpixel SP1 and the second subpixel SP2, it is possible to vary the voltage of the subpixel electrode 11b of the second subpixel SP2 effectively when the TFT 14 is turned on so that the difference in brightness between the two subpixels SP1 and SP2 increased.

Furthermore, according to Embodiment 1 (or Embodiment 2), the electrode pair consisting of the auxiliary-capacitance electrode 12 and the auxiliary-capacitance counter electrode 22 (or the electrode pair consisting of the auxiliary-capacitance electrode 12a and the auxiliary-capacitance counter electrode 22a as well as the electrode pair of the auxiliary-capacitance electrode 12b and the auxiliary-capacitance counter electrode 22b) is included as the electrode pair for defining the pixel P (or each of the first subpixel SP1 and the second subpixel SP2). The auxiliary-capacitance electrode 12 (or each of the auxiliary-capacitance electrodes 12a and 12b) is electrically connected to the pixel electrode 11 (or the subpixel electrodes 11a and 11b, respectively), and the auxiliary-capacitance counter electrode 22 (or each of the auxiliary-capacitance counter electrodes 22a and 22b) is connected to the electric potential of the counter electrode 21 (or the predetermined electric potential).

Therefore, in Embodiment 1, the auxiliary capacitance Ccs formed by the auxiliary-capacitance electrode 12 and auxiliary-capacitance counter electrode 22 is connected in parallel with the liquid-crystal capacitance Clc formed by the pixel electrode 11 and the counter electrode 21, and therefore it is possible to stably maintain the voltage, at least for one frame period, which is applied to the liquid-crystal layer 3 by the pixel P. In Embodiment 2, the auxiliary capacitance Ccs1 formed by the auxiliary-capacitance electrode 12a and the auxiliary-capacitance counter electrode 22a and the auxiliary-capacitance Ccs2 formed by the auxiliary-capacitance electrode 12b and the auxiliary-capacitance counter electrode 22b are connected in parallel with the liquid-crystal capacitance Clc1 formed by the counter electrode 21 and the subpixel electrode 11a and the liquid-crystal capacitance Clc2 formed by the counter electrode 21 and the subpixel electrode 11b, respectively. Therefore, it is possible to stably maintain the voltage, at least for one frame period, which is applied to the liquid-crystal layer 3 by the first subpixel SP1 and the second subpixel SP2. Because of the configuration in which the optimum counter voltage can be stably set, it is possible to emphasize the effect of preventing deviation of the counter voltage.

EXPLANATION OF SYMBOLS

P, Pn Pixel
SP1, SP2 Subpixel
Clc, Clc1, Clc2 Liquid-crystal capacitance
Ccs, Ccs1, Ccs2 Auxiliary capacitance
Cdc Discharge capacitance
CS1, CS2 Auxiliary-capacitance voltage line
CSL Auxiliary-capacitance voltage main wiring
Gn, Gm_n Scan-signal line
GDa, GDa1, GDa2, GDb Gate driver
Gsn Discharge-signal line
SD Source driver
SL Source-signal line
11 Pixel electrode
11a, 11b Subpixel electrode
12, 12a, 12b Auxiliary-capacitance electrode
13 Discharge-capacitance electrode
14, 15, 15a, 15b TFT
21 Counter electrode
22, 22a, 22b Auxiliary-capacitance counter electrode
23 Discharge-capacitance counter electrode
3 Liquid-crystal layer
4a, 4b Display control circuit
40 Image-signal input circuit
41 Source-signal control circuit
42a, 42b Scan-signal control circuit
43 Discharge-signal control circuit
44 Auxiliary-capacitance voltage generation circuit
100a, 100b Liquid-crystal panel

The invention claimed is:

1. A liquid-crystal display apparatus comprising:
pixels each defined so as to include an electrode pair consisting of a pixel electrode and a counter electrode facing one another via a liquid-crystal layer, the pixels being arrayed in a form of a matrix;
a plurality of switching elements for applying a data signal to the pixel electrode included in the respective pixels; and
a signal line arranged between pixels adjacent to one another in a row direction in which rows of the matrix are arranged, wherein a scan signal is applied to a control electrode of the switching element for each row of the matrix; wherein
the pixels comprise at least first and second subpixels being arranged in a direction intersecting the signal line,
each of the plurality of switching elements comprises first and second switching elements to apply the data signal to subpixel electrodes each included in the first and second subpixels respectively,
an electrode pair consisting of a discharge-capacitance electrode included in the second subpixel and a discharge-capacitance counter electrode connected to a predetermined electric potential is provided, and a third switching element connected between the subpixel electrode in the second subpixel and the discharge-capacitance electrode is provided, and
for each row of the matrix, a control electrode of the third switching element in one row of the rows is connected to the signal line between the one row and a next row of the one row, and a discharge signal is applied to the signal line between the one row and the next row, wherein the discharge signal is raised to turn on the third switching element in the one row when the scan signal applied to each control electrode of the first and second switching elements in the next row falls.

2. The liquid-crystal display apparatus according to claim 1, wherein the polarity of the data signal applied to the pixels is inverted for each frame period.

3. The liquid-crystal display apparatus according to claim 1, wherein the pixels are each defined so as to further include an electrode pair consisting of an auxiliary-capacitance electrode connected to the pixel electrode and an auxiliary-capacitance counter electrode connected to a predetermined electric potential.

4. A method for driving liquid-crystal display apparatus, the apparatus comprising: pixels each defined so as to include an electrode pair consisting of a pixel electrode and a counter electrode facing one another via a liquid-crystal layer, the pixels being arrayed in a form of a matrix; a plurality of switching elements for applying a data signal to the pixel electrode included in the respective pixels; and a signal line arranged between pixels adjacent to one another in a row direction in which rows of the matrix are arranged, wherein a scan signal is applied to a control electrode of the switching element for each row of the matrix, wherein
the pixels comprise at least first and second subpixels being arranged in a direction intersecting the signal line,
each of the plurality of switching elements comprises first and second switching elements to apply the data signal to subpixel electrodes each included in the first and second subpixels respectively,
an electrode pair consisting of a discharge-capacitance electrode included in the second subpixel and a discharge-capacitance counter electrode connected to a predetermined electric potential is provided, and a third switching element connected between the subpixel electrode in the second subpixel and the discharge-capacitance electrode is provided,
for each row of the matrix, a control electrode of the third switching element in one row of the rows is connected to the signal line between the one row and a next row of the one row, and the method comprises applying a discharge signal to the signal line between the one row and the next row, wherein the discharge signal is raised to turn on the third switching element in the one row when the scan signal applied to each control electrode of the first and second switching elements in the next row falls.

\* \* \* \* \*